United States Patent
Shirakawa

(10) Patent No.: US 8,489,634 B2
(45) Date of Patent: Jul. 16, 2013

(54) FILE ACCESS DESTINATION CONTROL DEVICE AND METHOD

(75) Inventor: Takahisa Shirakawa, Tokyo (JP)

(73) Assignee: NEC Personal Computers, Ltd, Tokyo (JP)

( * ) Notice: Subject to any disclaimer, the term of this patent is extended or adjusted under 35 U.S.C. 154(b) by 396 days.

(21) Appl. No.: 12/531,897

(22) PCT Filed: Jan. 17, 2008

(86) PCT No.: PCT/JP2008/050491
§ 371 (c)(1),
(2), (4) Date: Sep. 18, 2009

(87) PCT Pub. No.: WO2008/114522
PCT Pub. Date: Sep. 25, 2008

(65) Prior Publication Data
US 2010/0114959 A1    May 6, 2010

(30) Foreign Application Priority Data
Mar. 19, 2007    (JP) ................................ 2007-070619

(51) Int. Cl.
*G06F 17/30*    (2006.01)
(52) U.S. Cl.
USPC ........................................................ 707/781
(58) Field of Classification Search
None
See application file for complete search history.

(56) References Cited

U.S. PATENT DOCUMENTS

| 7,395,394 | B2 * | 7/2008 | Federa et al. | 711/163 |
|---|---|---|---|---|
| 7,526,800 | B2 * | 4/2009 | Wright et al. | 726/11 |
| 2004/0267746 | A1 * | 12/2004 | Marcjan et al. | 707/8 |

FOREIGN PATENT DOCUMENTS

| JP | 2001337864 A | 12/2001 |
|---|---|---|
| JP | 2004110457 A | 4/2004 |
| JP | 2007034686 A | 2/2007 |

OTHER PUBLICATIONS

International Search Report for PCT/JP2008/050491 mailed Mar. 25, 2008.
"Thin Client System", retrieved on Feb. 26, 2007, Internet <URL: http//www.express.nec.co.jp/products/thinclient.html>.
"Mate Thin Client/VersaPro Thin Client (network booting type)", retrieved on Feb. 26, 2007, Internet <URL: http://www.express.nec.co.jp/products/tc/index.html>.
"VersaPro Thin Client US50", retrieved on Feb. 26, 2007, Internet <URL: http://www.express.nec.co.jp/products/tc2/index.html>.

* cited by examiner

*Primary Examiner* — Belinda Xue
(74) *Attorney, Agent, or Firm* — Nutter McClennen & Fish LLP; John J. Penny, Jr.; Christina M. Sperry

(57) ABSTRACT

Provided is a file access destination control device capable of storing only a file requiring confidentiality in a server and storing a file not requiring confidentiality in a client. A file access destination control device includes: means for setting an access destination with respect to a file accessed by a program whose name is listed in a white list to the client-side storage device; means for setting the access destination with respect to a file accessed by a program whose name is listed in a redirect list to the server-side storage device; means for prohibiting a program whose name is listed neither in the white list nor redirect list from performing writing operation to a file; and means for setting the readout destination with respect to a file accessed by a program whose name is listed neither in the white list nor redirect list to the client-side storage device.

31 Claims, 20 Drawing Sheets

FIG.2

WHITE LIST1

PGM-001.EXE
 PGM-003.EXE
 PGM-007.EXE

WHITE LIST2

*.AAA
 *.CCC
 *.GGG

REDIRECT LIST1

PGM-002.EXE
 PGM-004.EXE
 PGM-008.EXE

REDIRECT LIST2

*.BBB
 *.DDD
 *.HHH

FIG.3 c:¥Documents and Settings¥Suzuki¥My Documents¥Report1.doc ¥¥FileServer¥Users¥Suzuki¥MyDocuments¥Report1.doc
c:¥Documents and Settings¥Suzuki¥My Documents¥Report2.doc ¥¥FileServer¥Users¥Suzuki¥MyDocuments¥Report2.doc
c:¥Documents and Settings¥Suzuki¥My Documents¥Report3.xls ¥¥FileServer¥Users¥Suzuki¥MyDocuments¥Report3.xls

FILE ACCESS DESTINATION CONTROL DEVICE AND METHOD

This application is the National Phase of PCT/JP2008/050491, filed Jan. 17, 2008, which is based upon and claims the benefit of priority from prior Japanese Patent Application No. 2007-070619 (filed Mar. 19, 2007) under the Paris Convention, the entire contents of which are incorporated herein by reference.

TECHNICAL FIELD

The present invention relates to a file access destination control device that sets the access destination with respect to a file to a client or a server, its method, and its computer program product and, more particularly, to a file access destination control device used in a thin client, its method, and its computer program product.

BACKGROUND ART

In recent years, leakage of confidential information through computers used in a company has become a problem. For example, a case may be considered where an employee takes a note-type personal computer provided with a hard disk drive storing his or her company's confidential data out of the office and he or she carelessly leaves the computer in a given place outside the office. In this case, there is a possibility that the company's confidential data may be leaked through his or her computer. Another case may be considered where a malicious employee copies his or her company's confidential data from a file server or a hard disk drive of a computer provided in the office to a USB (universal serial bus) memory or a CD-R (compact disc-recordable) so as to intentionally leak the data to a third-party.

In order to prevent such leakage of company's confidential information through a computer, the present inventor has proposed a thin client system. For example, a network booting thin client system, a screen transfer type thin client system, and a virtual PC type thin client system can be taken as the thin client system provided by the present applicant (refer to, e.g., NPLs (Non Patent Literatures) 1 to 3).

CITATION LIST

Non Patent Literature

{NPL 1} "Thin Client System" (retrieved on February 26, Heisei 19) Internet <URL: http://www.express.nec.co.jp/products/thinclient.html>
{NPL 2} "Mate Thin Client/VersaPro Thin Client (network booting type)" (retrieved on February 26, Heisei 19) Internet <URL:http://www.express.nec.co.jp/products/tc/index.html>
{NPL 3} "VersaPro Thin Client US50" (retrieved on February 26, Heisei 19) Internet <URL:http://www.express.nec.co.jp/products/tc2/index.html>

SUMMARY OF INVENTION

Technical Problem

However, in any type of the thin client systems mentioned above, the access destination with respect to a file including application data is set to a server. That is, regardless of the application type, it is impossible to read or write a file from/in a hard disk drive of a client. This is inconvenient since even a file not requiring confidentiality cannot be stored in a hard disk drive of a client.

Further, in any type of the thin client systems mentioned above, a client cannot be used in a stand-alone mode. Only ordinary-type computers can be used in a stand-alone mode. In this case although a rule is applied in which data files are stored in servers in order to prevent the information leakage, positive results cannot be achieved without user's conscious operation. As a result, it is impossible to guarantee that all confidential data are stored in the server.

Therefore, an object of the present invention is to provide a file access destination control device capable of storing a file requiring confidentiality in a server and storing a file not requiring confidentiality in a client, its method, and its program.

Solution to Problem

According to a first aspect of the present invention, there is provided a file access destination control device which selects a client-side storage device or a server-side storage as an actual access destination with respect to a file whose access destination is set to the client-side storage device by a program, comprising: a unit for setting the access destination with respect to a file that is accessed by a program whose name is listed in a white list to the client-side storage device; a unit for setting a writing destination with respect to a file accessed by a program whose name is not listed in the white list to the server-side storage device; and a unit for setting a preferential readout destination with respect to a file accessed by a program whose name is not listed in the white list to the server-side storage device and setting a non-preferential readout destination with respect to the file accessed by a program whose name is not listed in the white list to the client-side storage device.

According to a second aspect of the present invention, there is provided a file access destination control device which selects a client-side storage device or a server-side storage as an actual access destination with respect to a file whose access destination is set to the client-side storage device by a program, comprising: a unit for setting a writing destination with respect to a file accessed by a program whose name is listed in a redirect list to the server-side storage device; a unit for setting a preferential readout destination with respect to a file accessed by a program whose name is listed in the redirect list to the server-side storage device and setting a non-preferential readout destination with respect to the file accessed by the program whose name is listed in the redirect list to the client-side storage device; and a unit for setting the access destination with respect to a file accessed by a program whose name is not listed in the redirect list to the client-side storage device.

According to a third aspect of the present invention, there is provided a file access destination control device which selects a client-side storage device or a server-side storage as an actual access destination with respect to a file whose access destination is set to the client-side storage device by a program, comprising: a unit for setting the access destination with respect to a file accessed by a program whose name is listed in a white list to the client-side storage device; a unit for setting a writing destination with respect to a file accessed by a program whose name is listed in a redirect list to the server-side storage device; a unit for setting a preferential readout destination with respect to a file accessed by a program whose name is listed in the redirect list to the server-side storage device and setting a non-preferential readout destination with respect to the file accessed by the program whose name is listed in the redirect list to the client-side storage device; and a unit for prohibiting a program whose name is listed neither in the white list nor redirect list from performing writing operation of a file.

According to a fourth aspect of the present invention, there is provided a file access destination control device which selects a client-side storage device or a server-side storage as an actual access destination with respect to a file whose access destination is set to the client-side storage device by a program, comprising: a unit for setting the access destination with respect to a file whose attribute is listed in a white list to the client-side storage device; a unit for setting a writing destination with respect to a file whose attribute is not listed in the white list to the server-side storage device; and a unit for setting a preferential readout destination with respect to a file whose attribute is not listed in the white list to the server-side storage device and setting a non-preferential readout destination with respect to the file whose attribute is not listed in the white list to the client-side storage device.

According to a fifth aspect of the present invention, there is provided a file access destination control device which selects a client-side storage device or a server-side storage as an actual access destination with respect to a file whose access destination is set to the client-side storage device by a program, comprising: a unit for setting a writing destination with respect to a file whose attribute is listed in a redirect list to the server-side storage device; a unit for setting a preferential readout destination with respect to a file whose attribute is listed in the redirect list to the server-side storage device and setting a non-preferential readout destination with respect to the file whose attribute is listed in the redirect list to the client-side storage device; and a unit for setting the access destination with respect to a file whose attribute is not listed in the redirect list to the client-side storage device.

According to a sixth aspect of the present invention, there is provided a file access destination control device which selects a client-side storage device or a server-side storage as an actual access destination with respect to a file whose access destination is set to the client-side storage device by a program, comprising: a unit for setting the access destination with respect to a file whose attribute is listed in a white list to the client-side storage device; a unit for setting a writing destination with respect to a file whose attribute is listed in a redirect list to the server-side storage device; a unit for setting a preferential readout destination with respect to a file accessed by a program whose name is listed in the redirect list to the server-side storage device and setting a non-preferential readout destination with respect to the file accessed by a program whose name is listed in the redirect list to the client-side storage device; and a unit for prohibiting writing operation of a file whose attribute is listed neither in the white list nor redirect list.

According to a seventh aspect of the present invention, there is provided a file access destination control method which selects a client-side storage device or a server-side storage as an actual access destination with respect to a file whose access destination is set to the client-side storage device by a program, comprising the steps of setting the access destination with respect to a file that is accessed by a program whose name is listed in a white list to the client-side storage device; setting a writing destination with respect to a file accessed by a program whose name is not listed in the white list to the server-side storage device; and setting a preferential readout destination with respect to a file accessed by a program whose name is not listed in the white list to the server-side storage device and setting a non-preferential read-out destination with respect to the file accessed by a program whose name is not listed in the white list to the client-side storage device.

According to an eighth aspect of the present invention, there is provided a file access destination control method which selects a client-side storage device or a server-side storage as an actual access destination with respect to a file whose access destination is set to the client-side storage device by a program, comprising the steps of: setting a writing destination with respect to a file accessed by a program whose name is listed in a redirect list to the server-side storage device; setting a preferential readout destination with respect to a file accessed by a program whose name is listed in the redirect list to the server-side storage device and setting a non-preferential readout destination with respect to the file accessed by a program whose name is listed in the redirect list to the client-side storage device; and setting the access destination with respect to a file accessed by a program whose name is not listed in the redirect list to the client-side storage device.

According to a ninth aspect of the present invention, there is provided a file access destination control method which selects a client-side storage device or a server-side storage as an actual access destination with respect to a file whose access destination is set to the client-side storage device by a program, comprising the steps of setting the access destination with respect to a file accessed by a program whose name is listed in a white list to the client-side storage device; setting a writing destination with respect to a file accessed by a program whose name is listed in a redirect list to the server-side storage device; setting a preferential readout destination with respect to a file accessed by a program whose name is listed in the redirect list to the server-side storage device and setting the non-preferential readout destination with respect to the file accessed by a program whose name is listed in the redirect list to the client-side storage device; and prohibiting a program whose name is listed neither in the white list nor redirect list from performing writing operation of a file.

According to a tenth aspect of the present invention, there is provided a file access destination control method which selects a client-side storage device or a server-side storage as an actual access destination with respect to a file whose access destination is set to the client-side storage device by a program, comprising the steps of setting the access destination with respect to a file whose attribute is listed in a white list to the client-side storage device; setting a writing destination with respect to a file whose attribute is not listed in the white list to the server-side storage device; and setting a preferential readout destination with respect to a file whose attribute is not listed in the white list to the server-side storage device and setting the non-preferential readout destination with respect to the file whose attribute is not listed in the white list to the client-side storage device.

According to an eleventh aspect of the present invention, there is provided a file access destination control method which selects a client-side storage device or a server-side storage as an actual access destination with respect to a file whose access destination is set to the client-side storage device by a program, comprising the steps of setting a writing destination with respect to a file whose attribute is listed in a redirect list to the server-side storage device; setting a preferential readout destination with respect to a file whose attribute is listed in the redirect list to the server-side storage device and setting a non-preferential readout destination with respect to the file whose attribute is listed in the redirect list to the client-side storage device; and setting the access destination with respect to a file whose attribute is not listed in the redirect list to the client-side storage device.

According to a twelfth aspect of the present invention, there is provided a file access destination control method which selects a client-side storage device or a server-side storage as an actual access destination with respect to a file whose access destination is set to the client-side storage device by a program, comprising the steps of: setting the access destination with respect to a file whose attribute is listed in a white list to the client-side storage device; setting a writing destination with respect to a file whose attribute is listed in a redirect list to the server-side storage device; setting a preferential readout destination with respect to a file accessed by a program whose name is listed in the redirect list to the server-side storage device and setting a non-preferential readout destination with respect to the file accessed by a program whose name is listed in the redirect list to the client-side storage device; and prohibiting writing operation of a file whose attribute is listed neither in the white list nor redirect list.

Advantageous Effects of Invention

According to the present invention, it is possible to store only a file requiring confidentiality in a server and storing a file not requiring confidentiality in a client.

BRIEF DESCRIPTION OF DRAWINGS

{FIG. 2} A view showing an example of a white list and a redirect list according to embodiments of the present invention.

{FIG. 3} A view showing an example of a map list according to embodiments of the present invention.

DESCRIPTION OF EMBODIMENTS

Preferred embodiment for practicing the present invention will be described below with reference to the accompanying drawings.

[First Embodiment]

In the first embodiment, a white list is used to set the access destination with respect to a file that is accessed by a program. That is, the access destination with respect to a file that is accessed by a program listed in the white list is set to a client-side storage device or the access destination with respect to a file whose attribute is listed in the white list is set to a client-side storage device, and the access destination with respect to the other files is set to a server-side storage device.

Examples of the attribute include extension of file, creation date of file, document type of file, creator of file, name of company to which creator of file belongs, file size, presence/absence of encryption setting for file, access information such as Read-only or hidden file attribute or combination thereof.

Figure 1:
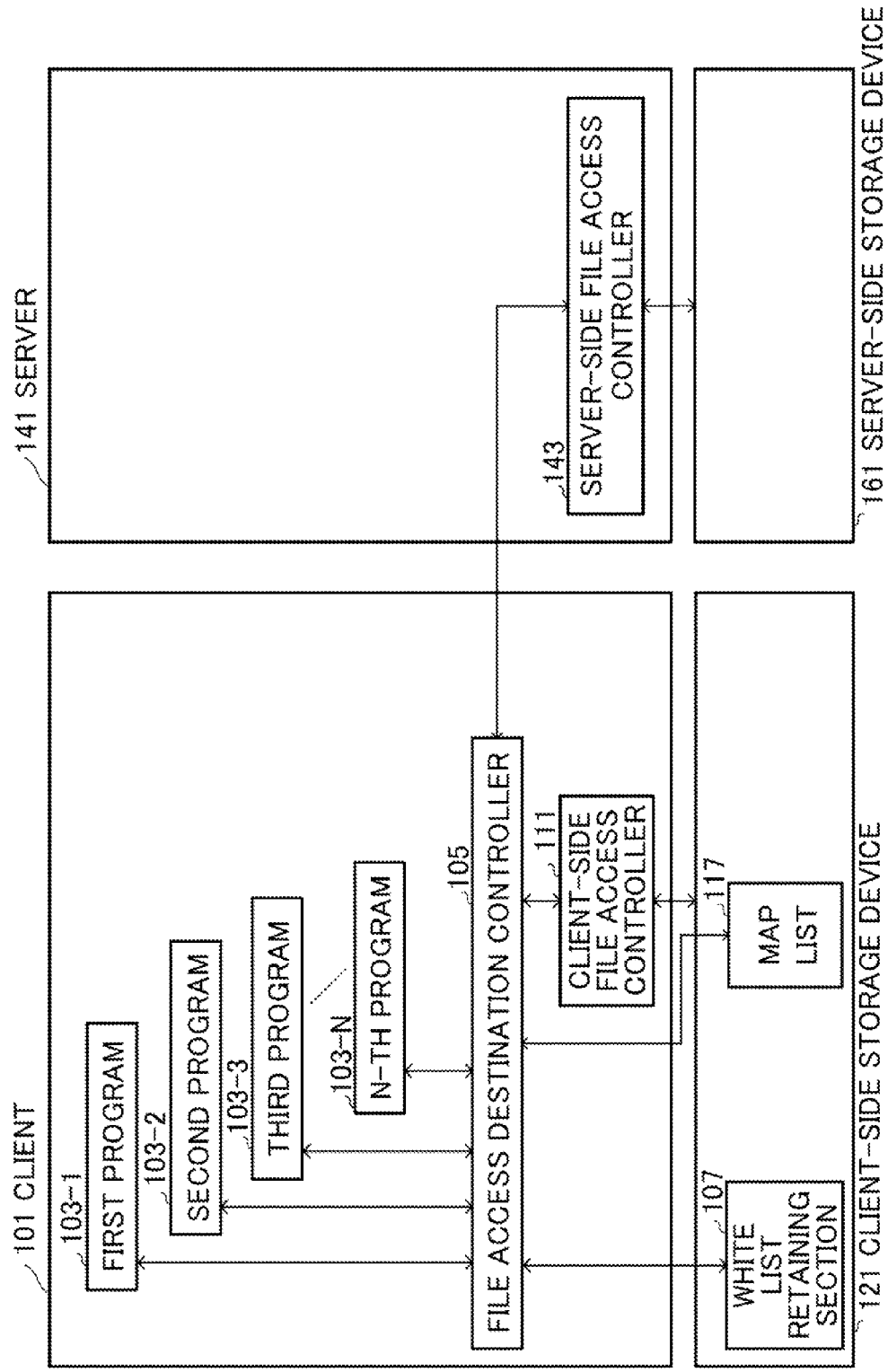
{FIG. 1} A view showing a configuration of a system including a file access destination control device according to a first embodiment of the present invention.

FIG. 1 is a view showing a configuration of a system including a file access destination control device according to the first embodiment of the present invention.

The system shown in FIG. 1 includes a client 101 and a server 141. Although only one client 101 is shown in FIG. 1 for simplification of explanation, a plurality of clients 101 are generally connected to one server.

The client 101 and server 141 are each constituted by a computer including a CPU and a main memory. Respective sections (first program 103-1 to N-th program 103-N, file access destination controller 105, and client-side storage device 111) constituting the client 101 are programs each operate using the CPU and main memory. Similarly, a server-side file access controller 143 of the server 141 is a program operating using the CPU and main memory. A program is recorded on a computer readable medium such as hard disk drive, is transferred to the main memory, and read and executed by the CPU to constitute each of the client 101 and server 141.

The first program 103-1 to N-th program 103-N are each a program that can operate by itself, such as a word processor, a spreadsheet program, a presentation program, a database management program, a mailer, an Web browser, or a filer, where one program can activate another program as a child process.

There is no need to make a modification to the program in order to achieve the present embodiment, but an existing program can be utilized.

The file access destination controller 105 controls the access destination with respect to a file that the first to N-th programs 103-1 to 103-N read or write. The control method will be described later.

The client-side file access controller 111 controls read/write of a file the access destination with respect to which has been set to the client-side storage device 121.

The server-side file access controller 143 controls read/write of a file the access destination with respect to which has been set to the server-side storage device 161.

A white list retaining section 107 is provided in the client-side storage device 121 and data of the white list retaining section 107 is read out therefrom by the file access destination controller 105 in order for the file access destination controller 105 to control the access destination with respect to a file. Thus, the white list retaining section 107 may be provided in any desired location as long as data of the white list retaining section 107 can be read out by the file access destination controller 105. Instead, for the purpose of preventing the data of the white list retaining section 107 from being rewritten, the white list retaining section 107 is preferably provided in the server-side storage device 161. An example of the white list is shown in FIG. 2.

A map list 117 retains information about a given file that has been written in the server-side storage device 161 in place of being written in the client-side storage device 121. More specifically, the map list 117 retains a correspondence between a set of the full path and name of the given file supposed to be obtained if it would have been written in the client-side storage device 121 and a set of the full path and name of the given file that has actually been written in the server-side storage device 161. An example of the map list 117 is shown in FIG. 3.

Figure 4:
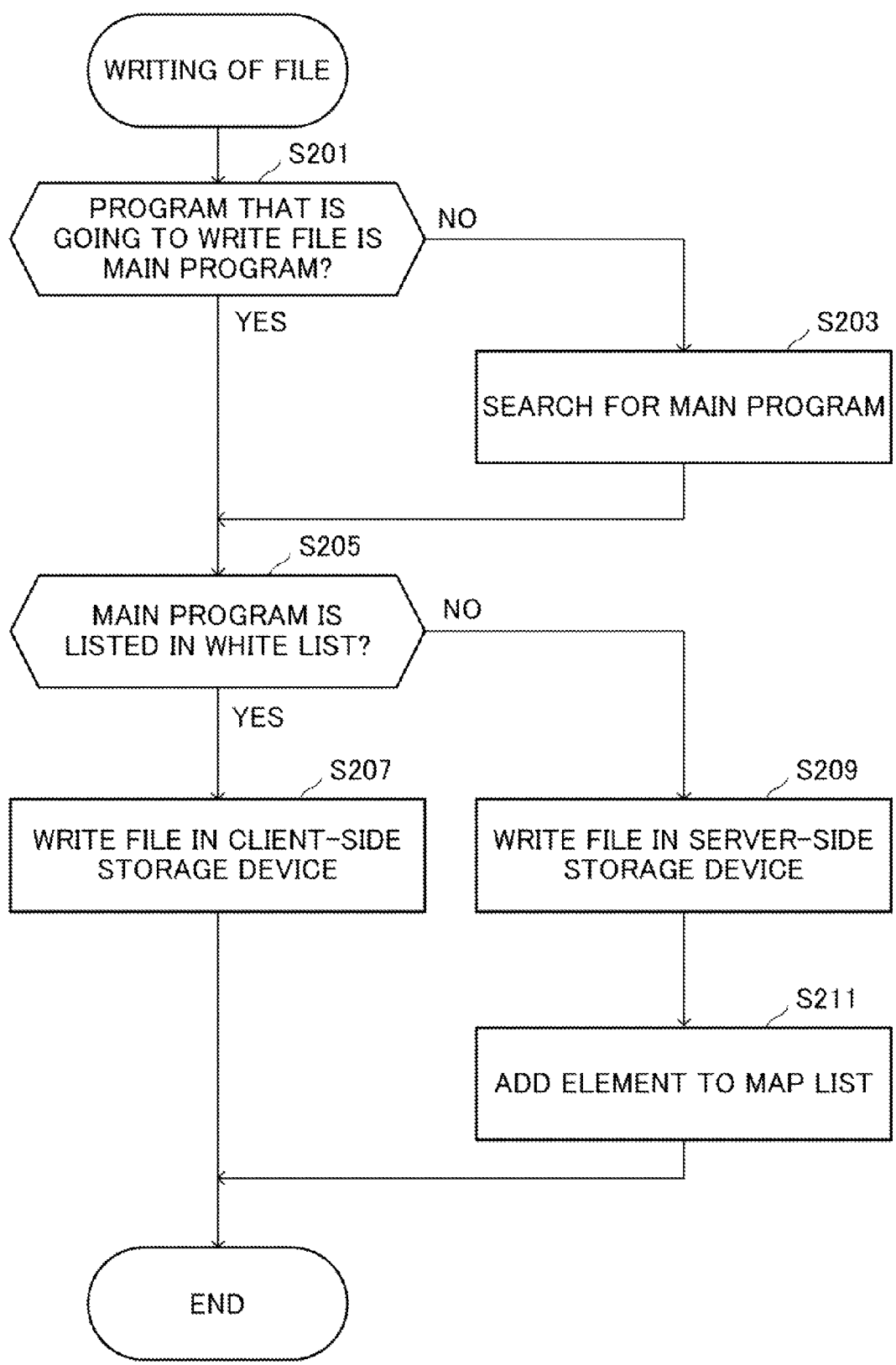
{FIG. 4} A flowchart showing a first operation of the file access destination control device at the writing time of a file according to the first embodiment of the present invention.

A first example of operation performed when the file access destination controller 105 writes a file will be described with reference to FIG. 4.

First, whether the program that is going to write a file in the client-side storage device 121 is the main program or not is checked (step S201). In the case where the program is not the main program (NO in step S201), the main program is searched for by tracing a path to an invoker (step S203).

Then, whether the main program is listed in the white list stored in the white list retaining section 107 is checked (step S205).

In the case where the main program is listed in the white list (YES in step S205), the file is written in the client-side storage device 121 through the client-side file access controller 111 (step S207).

On the other hand, in the case where the main program is not listed in the white list (NO in step S205), the file is written in the server-side storage device 161 through the server-side file access controller 143 (step S209). Then, a set of the full path and name of the file supposed to be obtained if it would have been written in the client-side storage device 121 and a set of the full path and name of the file that has actually been written are added to the map list (step S211).

In the case where the main program activates another program as a child process, when an attribute indicating whether the main program is listed in the white list is passed over to the child program, it is possible to omit steps S201 and S203.

Figure 5:
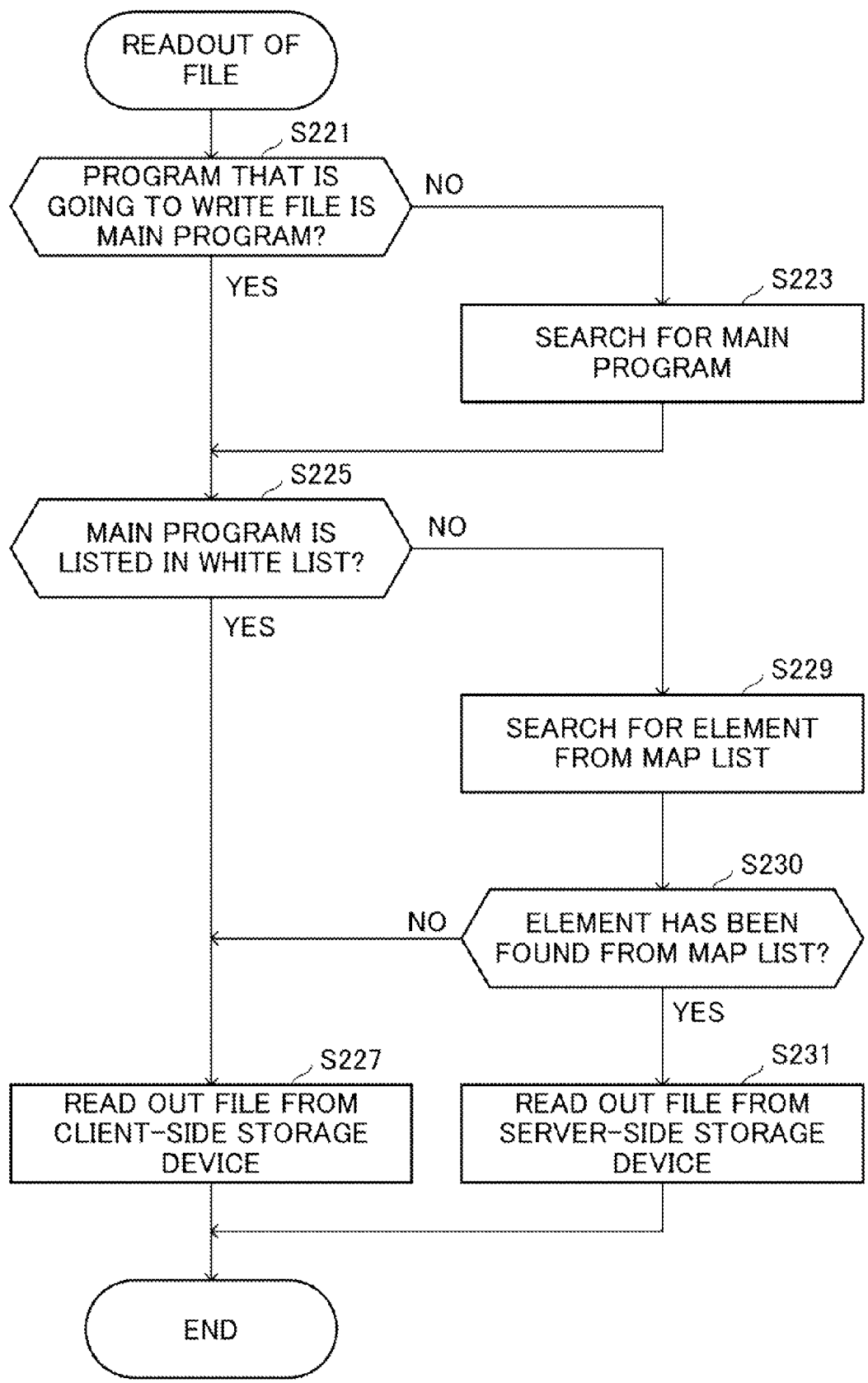
{FIG. 5} A flowchart showing a first operation of the file access destination control device at the readout time of a file according to the first embodiment of the present invention.

Next, a first example of operation performed when the file access destination controller 105 reads a file will be described with reference to FIG. 5.

First, whether the program that is going to read out a file is the main program or not is checked (step S221). In the case where the program is not the main program (NO in step S221), the main program is searched for by tracing a path to an invoker (step S223).

Then, whether the main program is listed in the white list stored in the white list retaining section 107 is checked (step S225).

In the case where the main program is listed in the white list (YES in step S225), the file is read out from the client-side storage device 121 through the client-side file access controller 111 (step S227).

On the other hand, in the case where the main program is not listed in the white list (NO in step S225), a readout destination is searched for based on the correspondence between a set of the full path and name of the file supposed to be obtained if it would have been written in the client-side storage device 121 and a set of the full path and name of the file that has actually been written (step S229).

In the case where the readout destination has been found (YES in step S230), the file is read out from the server-side storage device 161 through the server-side file access controller 143 (step S231). In the case where the readout destination has not been found (NO in step S230), the file is read out from the client-side storage device 121 through the client-side file access controller 111 (step S227).

In the case where the main program activates another program as a child process, when an attribute indicating whether the main program is listed in the white list is passed over to the child program, it is possible to omit steps S221 and S223.

Figure 6:
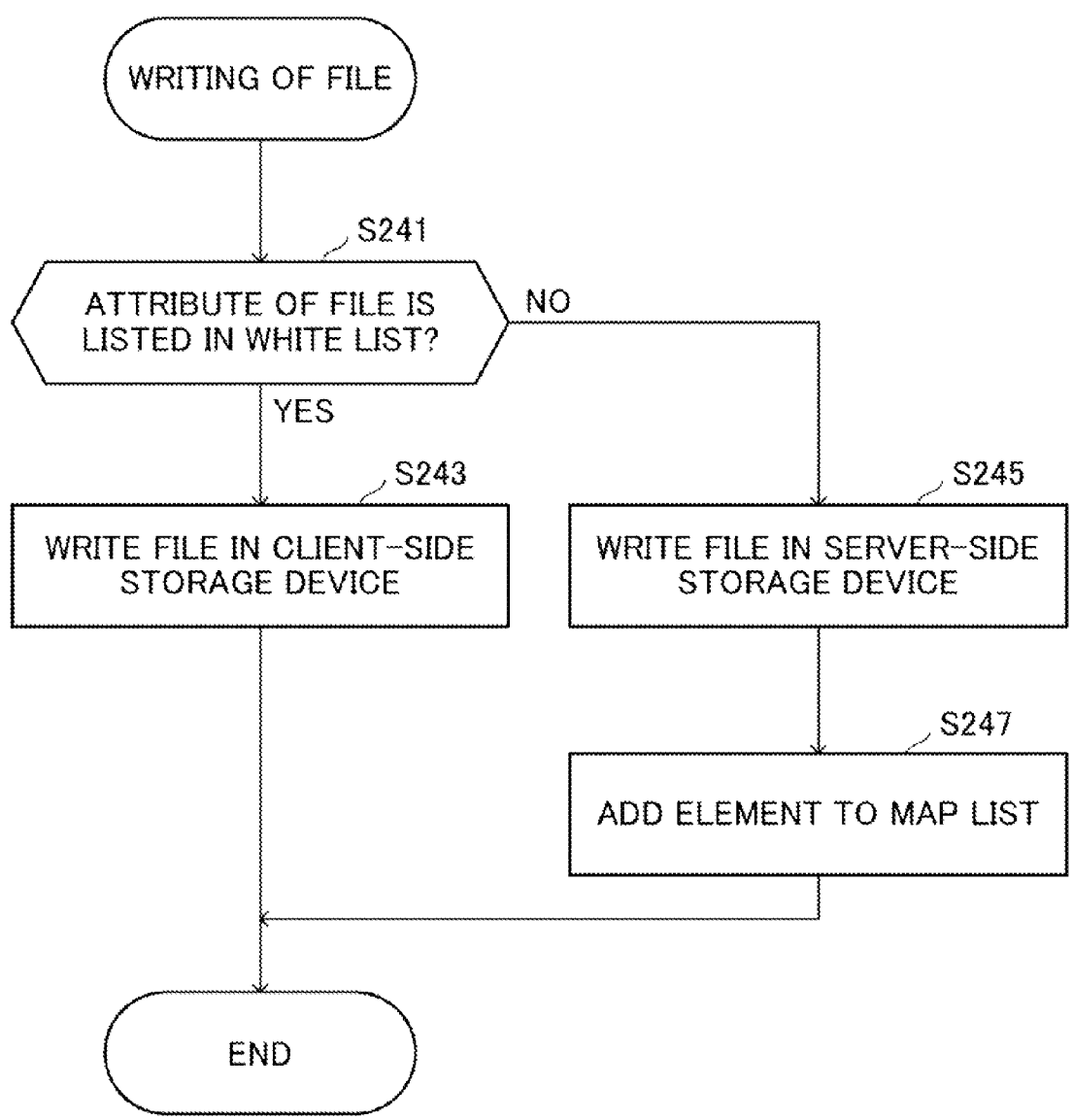
{FIG. 6} A flowchart showing a second operation of the file access destination control device at the writing time of a file according to the first embodiment of the present invention.

Next, a second example of operation performed when the file access destination controller 105 writes a file will be described with reference to FIG. 6.

First, whether the attribute of a file to be written is listed in the white list is checked (step S241).

In the case where the attribute of the file to be written is listed in the white list (YES in step S241), the file is written in the client-side storage device 121 through the client-side file access controller 111 (step S243).

On the other hand, in the case where the attribute of the file to be written is not listed in the white list (NO in step S241), the file is written in the server-side storage device 161 through the server-side file access controller 143 (step S245). Then, a set of the full path and name of the file supposed to be obtained if it would have been written in the client-side storage device 121 and a set of the full path and name of the file that has actually been written are added to the map list (step S247).

Figure 7:
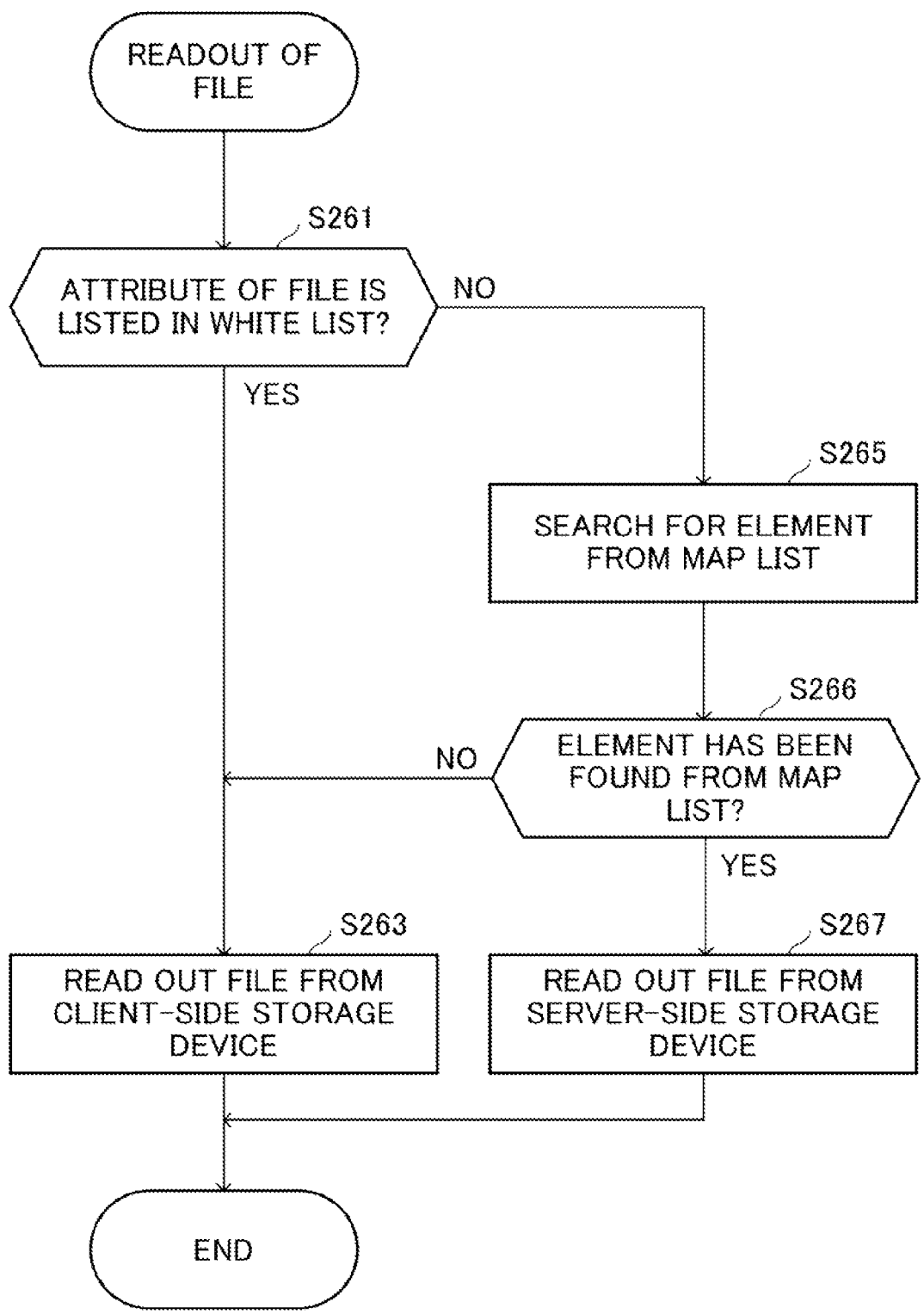
{FIG. 7} A flowchart showing a second operation of the file access destination control device at the readout time of a file according to the first embodiment of the present invention.

Next, a second example of operation performed when the file access destination controller 105 reads a file will be described with reference to FIG. 7.

First, whether the attribute of a file to be read out is listed in the white list is checked (step S261).

In the case where the attribute of the file to be read out is listed in the white list (YES in step S261), the file is read out from the client-side storage device 121 through the client-side file access controller 111 (step S263).

On the other hand, in the case where the attribute of the file to be read out is not listed in the white list (NO in step S261), a readout destination is searched for based on the correspondence between a set of the full path and name of the file supposed to be obtained if it would have been written in the client-side storage device 121 and a set of the full path and name of the file that has actually been written (step S265). In the case where the readout destination has been found (YES in step S266), the file is read out from the server-side storage device 161 through the server-side file access controller 143 (step S267). In the case where the readout destination has not been found (NO in step S266), the file is read out from the client-side storage device 121 through the client-side file access controller 111 (step S263).

According to the first embodiment, by listing, e.g., Windows® update program in the white list, the Windows® update can smoothly be executed.

Further, according to the first embodiment, by excluding a word processor program from the white list, it is possible to prevent a document file from being written in the client-side storage device.

[Second Embodiment]

In the second embodiment, a redirect list is used to set the access destination with respect to a file that is accessed by a program. That is, the access destination with respect to a file that is accessed by a program listed in the redirect list is set to a server-side storage device or the access destination with respect to a file whose attribute is listed in the redirect list is set to a server-side storage device, and the access destination with respect to other files is set to a client-side storage device.

Figure 8:
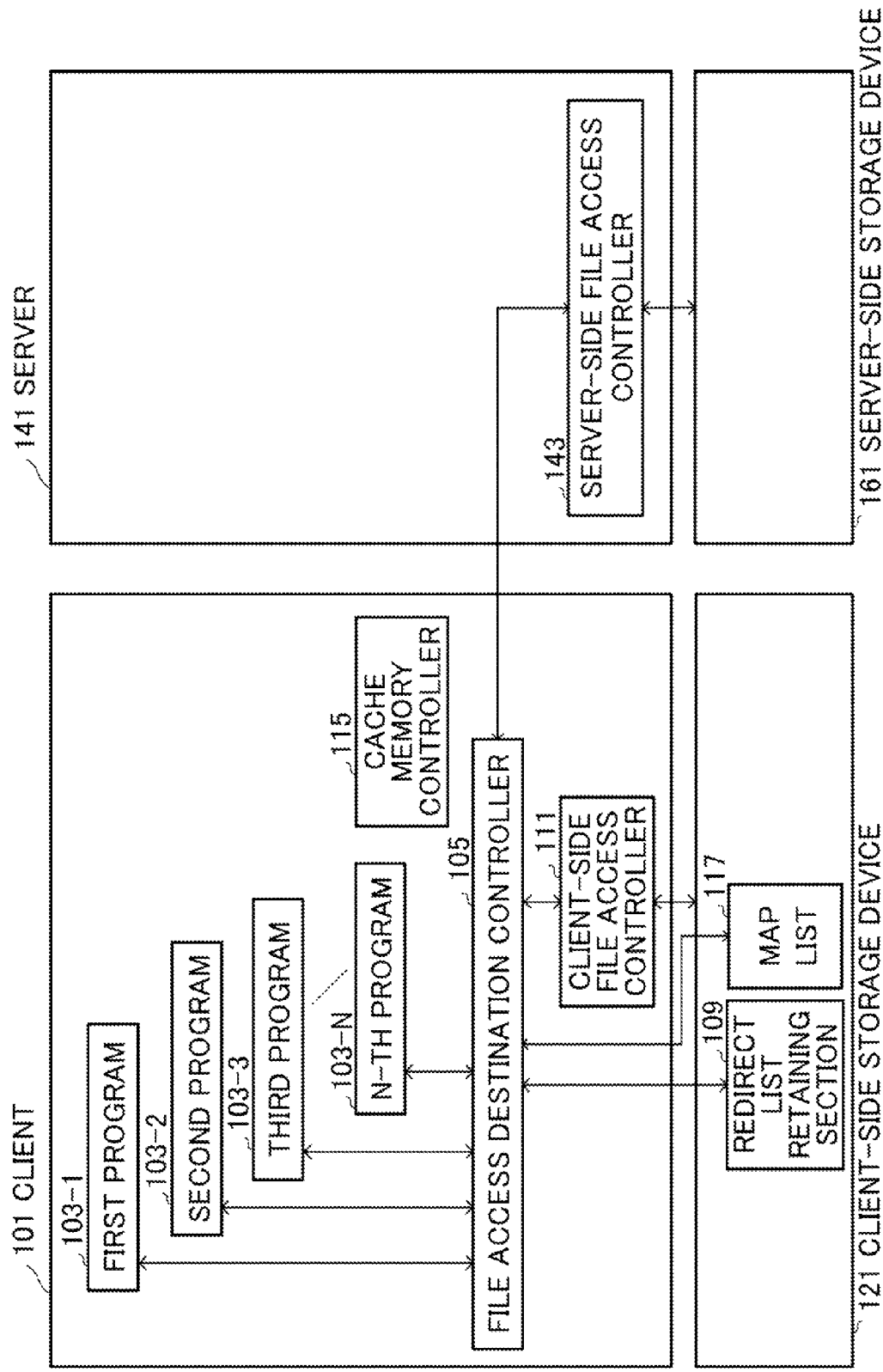
{FIG. 8} A view showing a configuration of a system including a file access destination control device according to a second embodiment of the present invention.

FIG. 8 is a view showing a configuration of a system including a file access destination control device according to the second embodiment of the present invention.

The second embodiment differs from the first embodiment in that a redirect list retaining section 109 is provided in place of the white list retaining section 107.

The redirect list retaining section 109 is provided in the client-side storage device 121 and data of the redirect list retaining section 109 is read out therefrom by the file access destination controller 105 in order for the file access destination controller 105 to control the access destination with respect to a file. Thus, the redirect list retaining section 109 may be provided in any desired location as long as data of the redirect list retaining section 109 can be read out by the file access destination controller 105. Instead, for the purpose of preventing the data of the redirect list retaining section 109 from being rewritten, the redirect list retaining section 109 is preferably provided in the server-side storage device 161. An example of the redirect list is shown in FIG. 2.

Figure 9:
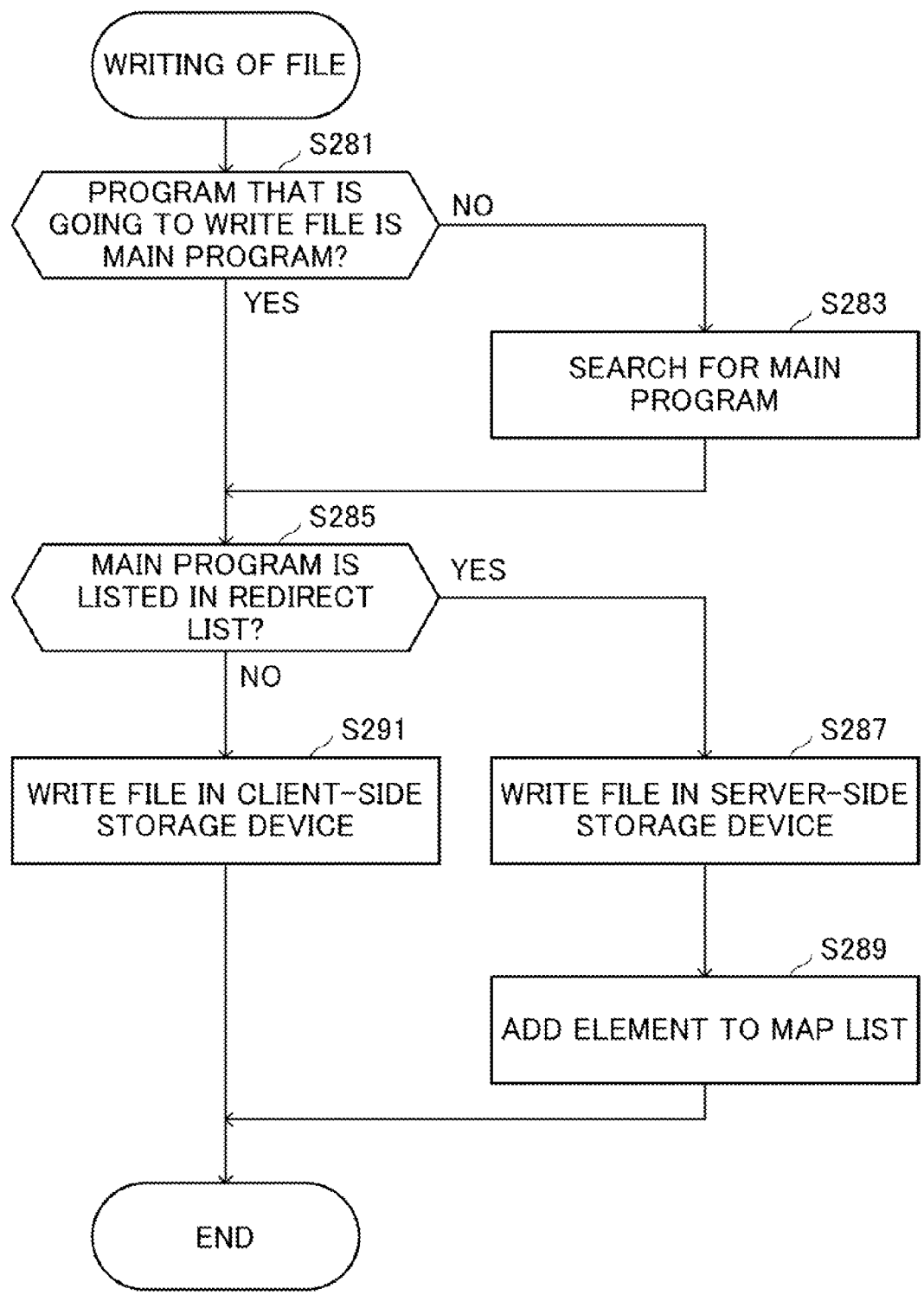
{FIG. 9} A flowchart showing a first operation of the file access destination control device at the writing time of a file according to the second embodiment of the present invention.

A first example of operation performed when the file access destination controller 105 writes a file will be described with reference to FIG. 9.

First, whether the program that is going to write a file in the client-side storage device 121 is the main program or not is checked (step S281). In the case where the program is not the main program (NO in step S281), the main program is searched for by tracing a path to an invoker (step S283).

Then, whether the main program is listed in the redirect list stored in the redirect list retaining section 109 is checked (step S285).

In the case where the main program is listed in the redirect list (YES in step S285), the file is written in the server-side storage device 161 through the server-side file access controller 143 (step S287). Then, a set of the full path and name of the file supposed to be obtained if it would have been written in the client-side storage device 121 and a set of the full path and name of the file that has actually been written are added to the map list (step S289).

On the other hand, in the case where the main program is not listed in the redirect list (NO in step S285), the file is written in the client-side storage device 121 through the client-side file access controller 111 (step S291).

In the case where the main program activates another program as a child process, when a configuration an attribute indicating whether the main program is listed in the redirect list is passed over to the child program, it is possible to omit steps S281 and S283.

Figure 10:
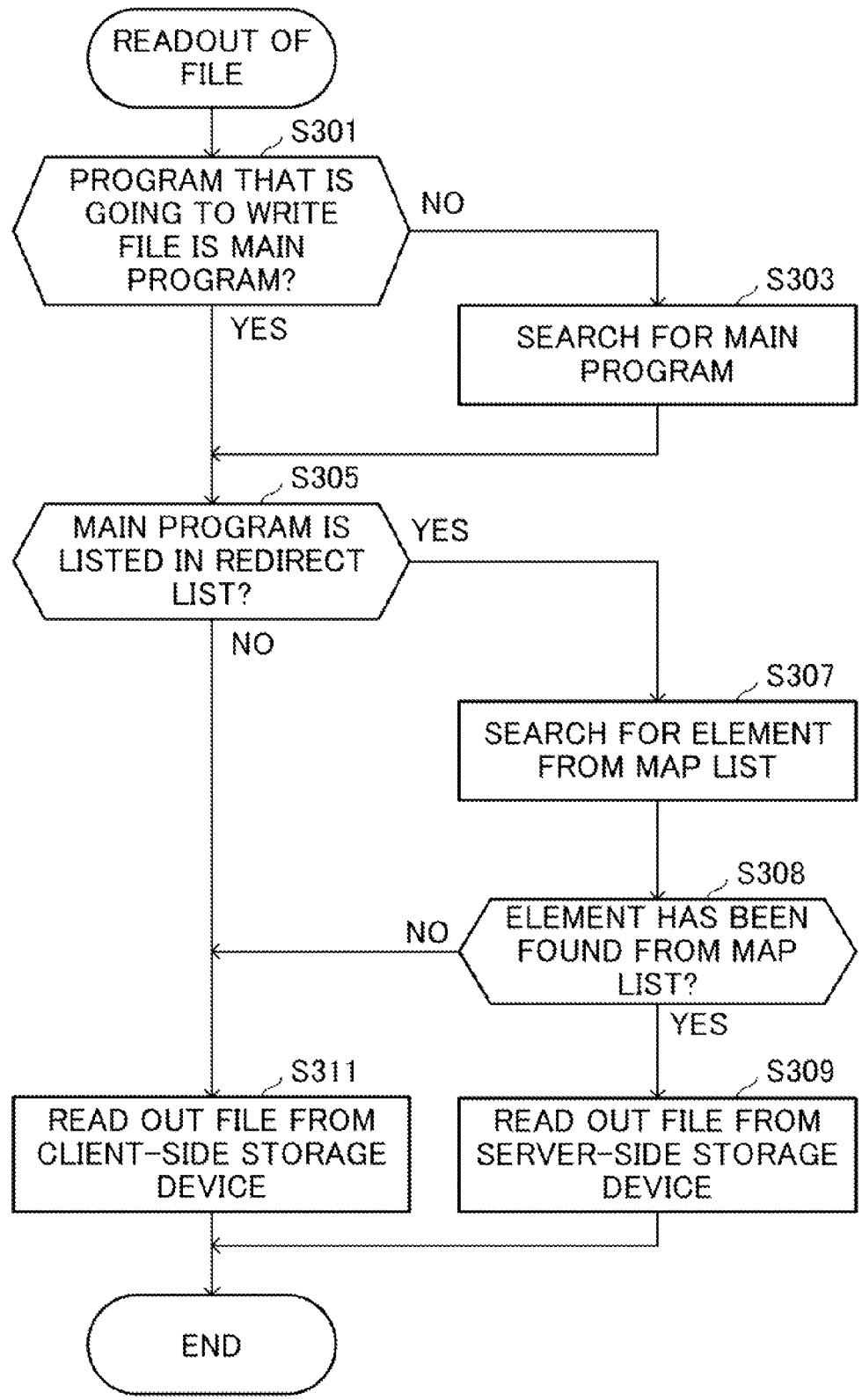
{FIG. 10} A flowchart showing a first operation of the file access destination control device at the readout time of a file according to the second embodiment of the present invention.

Next, a first example of operation performed when the file access destination controller 105 reads a file will be described with reference to FIG. 10.

First, whether the program that is going to read out a file is the main program or not is checked (step S301). In the case where the program is not the main program (NO in step S301), the main program is searched for by tracing a path to an invoker (step S303).

Then, whether the main program is listed in the redirect list stored in the redirect list retaining section 109 is checked (step S305).

In the case where the main program is listed in the redirect list (YES in step S305), a readout destination is searched for based on the correspondence between a set of the full path and name of the file supposed to be obtained if it would have been written in the client-side storage device 121 and a set of the full path and name of the file that has actually been written (step S307). In the case where the readout destination has been found (YES in step S308), the file is read out from the server-side storage device 161 through the server-side file access controller 143 (step S309). In the case where the readout destination has not been found (NO in step S308), the file is read out from the client-side storage device 121 through the client-side file access controller 111 (step S311).

On the other hand, in the case where the main program is not listed in the redirect list (NO in step S305), the file is read out from the client-side storage device 121 through the client-side file access controller 111 (step S311).

In the case where the main program activates another program as a child process, when an attribute indicating whether the main program is listed in the redirect list is passed over to the child program, it is possible to omit steps S301 and S303.

Figure 11:
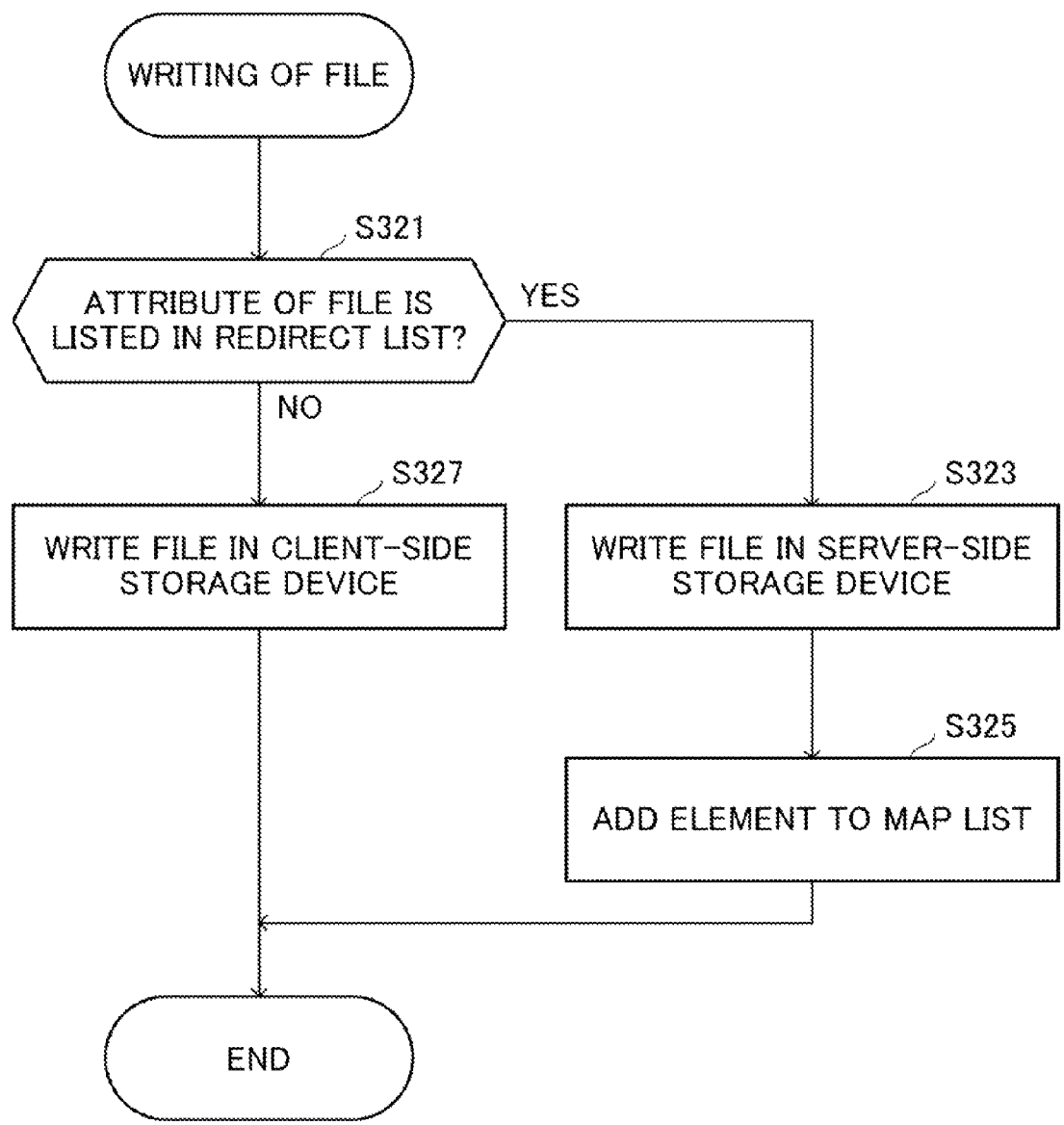
{FIG. 11} A flowchart showing a second operation of the file access destination control device at the writing time of a file according to the second embodiment of the present invention.

Next, a second example of operation performed when the file access destination controller 105 writes a file will be described with reference to FIG. 11.

First, whether the attribute of a file to be written is listed in the redirect list is checked (step S321).

In the case where the attribute of the file to be written is listed in the redirect list (YES in step S321), the file is written in the server-side storage device 161 through the server-side file access controller 143 (step S323). Then, a set of the full path and name of the file supposed to be obtained if it would have been written in the client-side storage device 121 and a set of the full path and name of the file that has actually been written are added to the map list (step S325).

On the other hand, in the case where the attribute of the file to be written is not listed in the redirect list (NO in step S321), the file is written in the client-side storage device 121 through the client-side file access controller 111 (step S327).

Figure 12:
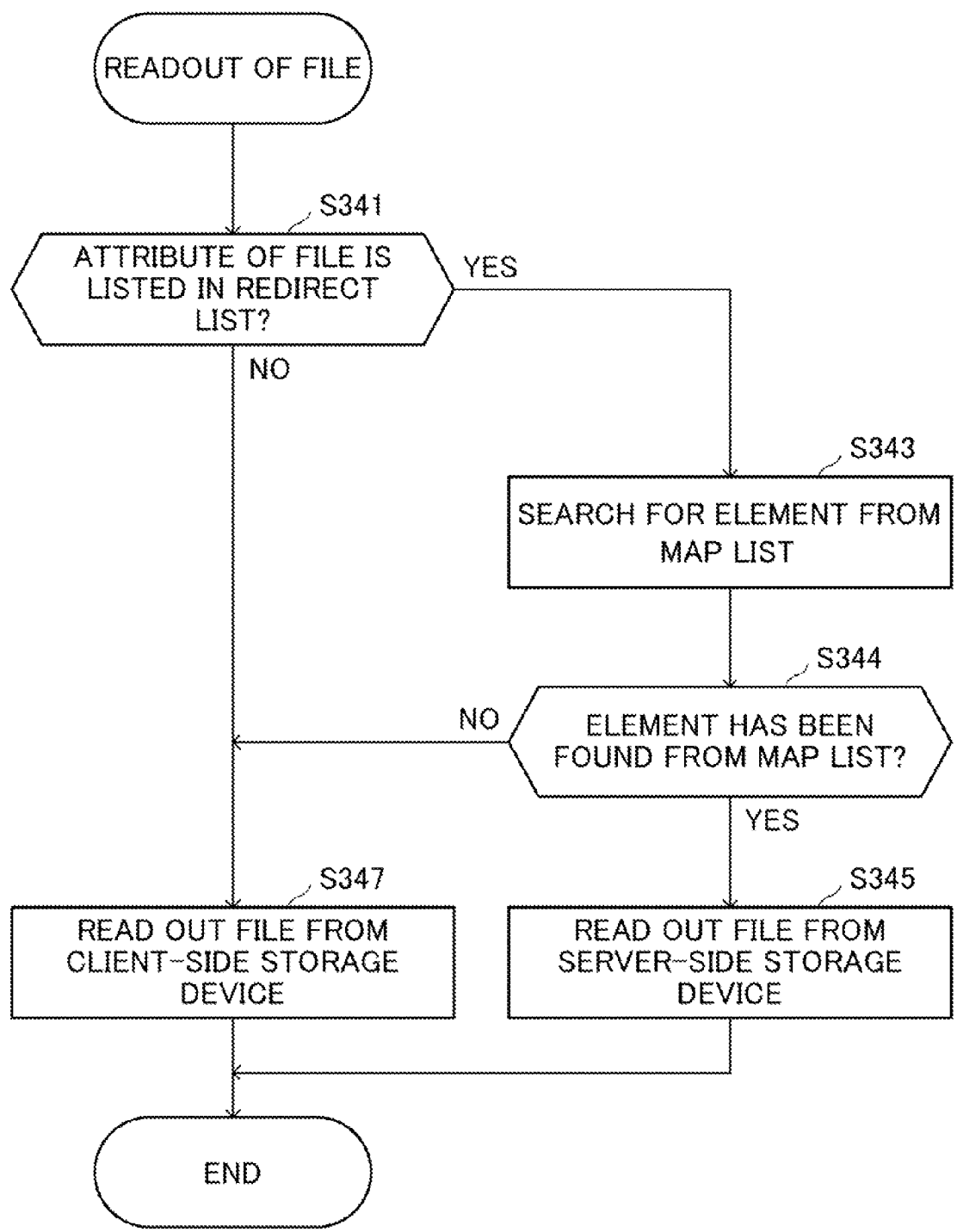
{FIG. 12} A flowchart showing a second operation of the file access destination control device at the readout time of a file according to the second embodiment of the present invention.

Next, a second example of operation performed when the file access destination controller 105 reads a file will be described with reference to FIG. 12.

First, whether the attribute of a file to be read out is listed in the redirect list is checked (step S341).

In the case where the attribute of the file to be read out is listed in the redirect list (YES in step S341), a readout destination is searched for based on the correspondence between a set of the full path and name of the file supposed to be obtained if it would have been written in the client-side storage device 121 and a set of the full path and name of the file that has actually been written (step S343). In the case where the readout destination has been found (YES in step S344), the file is read out from the server-side storage device 161 through the server-side file access controller 143 (step S345).

In the case where the readout destination has not been found (NO in step S344), the file is read out from the client-side storage device 121 through the client-side file access controller 111 (step S347).

On the other hand, in the case where the attribute of the file to be read out is not listed in the redirect list (NO in step S341), the file is read out from the client-side storage device 121 through the client-side file access controller 111 (step S347).

According to the second embodiment, by excluding, e.g., Windows® update program from the redirect list, the Windows® update can be executed smoothly.

Further, according to the second embodiment, by listing a word processor program in the redirect list, it is possible to prevent a document file from being written in the client-side storage device.

[Third Embodiment]

In the third embodiment, both the white list and redirect list are used. That is, the access destination with respect to a file that is accessed by a program whose name is listed in the white list is set to a client-side storage device or the access destination with respect to a file whose attribute is listed in the white list is set to a client-side storage device; access destination with respect to a file that is accessed by a program whose name is listed in the redirect list is set to a server-side storage device or the access destination with respect to a file whose attribute is listed in the redirect list is set to a server-side storage device; writing to a file accessed by a program whose name is listed in neither the white list nor redirect list is prohibited; and readout destination with respect to a file accessed by a program whose name is listed in neither the white list nor redirect list is set to the client-side storage device.

Figure 13:
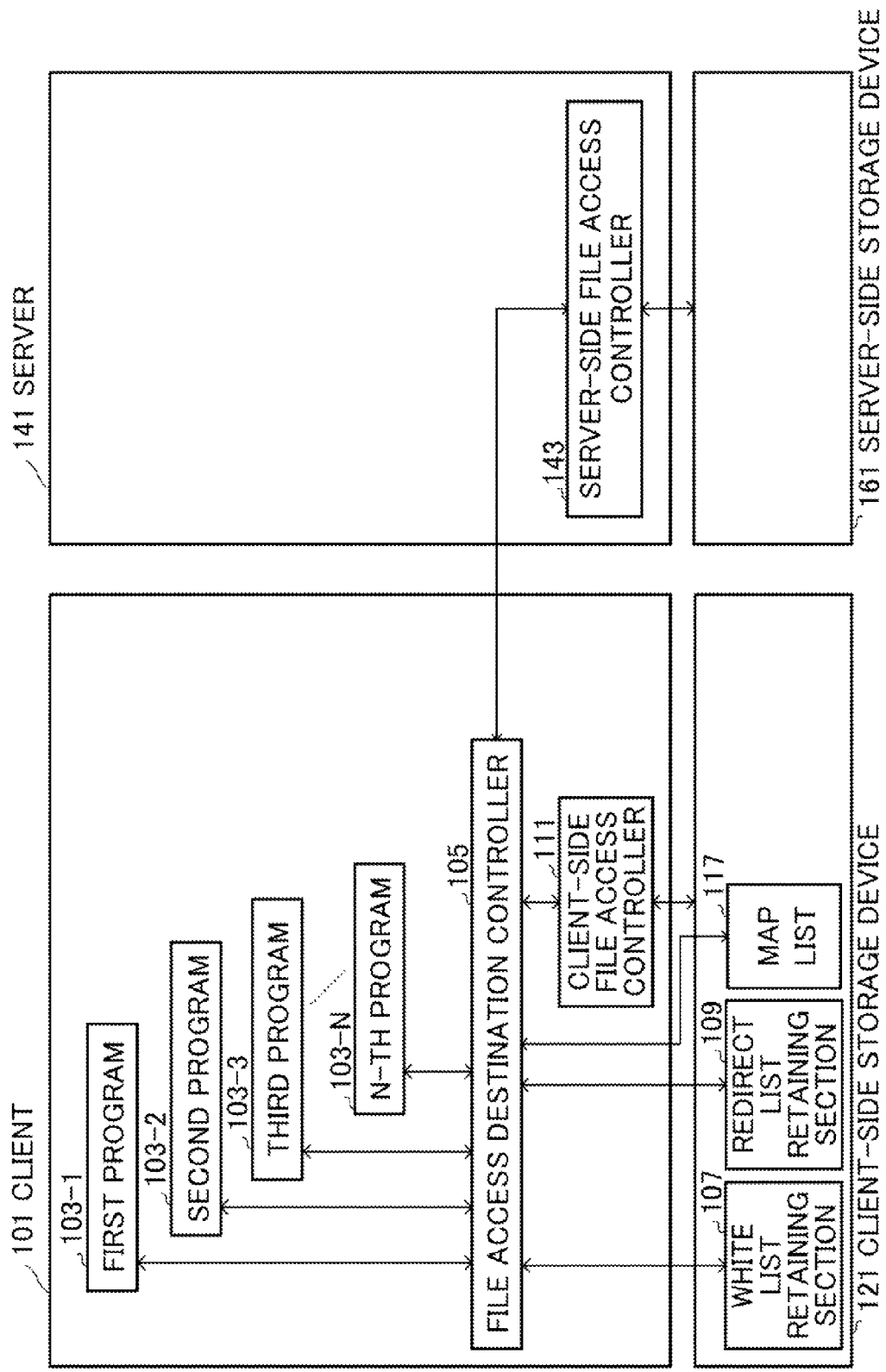
{FIG. 13} A view showing a configuration of a system including a file access destination control device according to a third embodiment of the present invention.

FIG. 13 is a view showing a configuration of a system including a file access destination control device according to the third embodiment of the present invention.

The third embodiment differs from the first and second embodiments in that both the white list retaining section 107 and redirect list retaining section 109 are provided.

Figure 14:
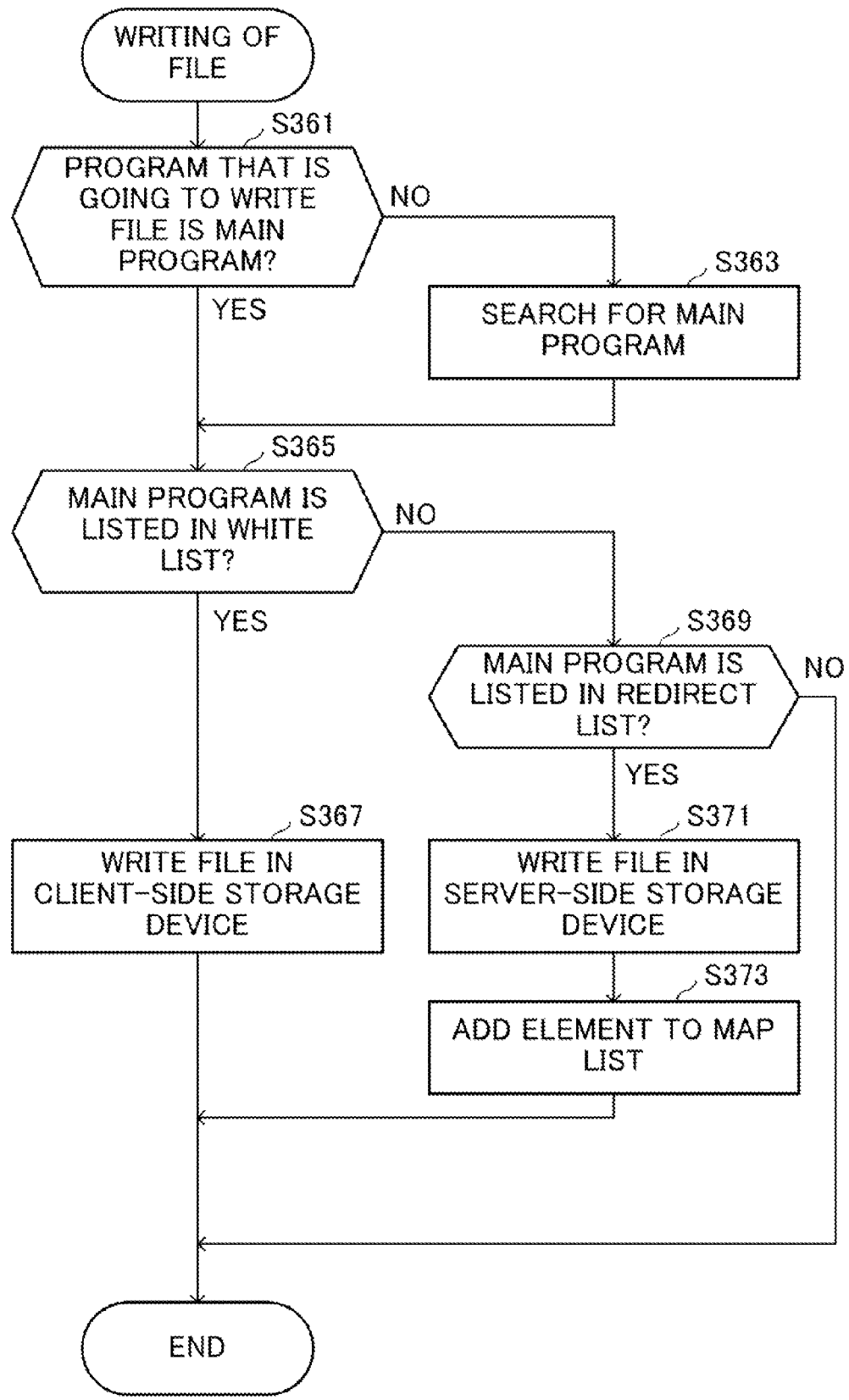
{FIG. 14} A flowchart showing a first operation of the file access destination control device at the writing time of a file according to the third embodiment of the present invention.

A first example of operation performed when the file access destination controller 105 writes a file will be described with reference to FIG. 14.

First, whether the program that is going to write a file in the client-side storage device 121 is the main program or not is checked (step S361). In the case where the program is not the main program (NO in step S361), the main program is searched for by tracing a path to an invoker (step S363).

Then, whether the main program is listed in the white list stored in the white list retaining section 107 is checked (step S365).

In the case where the main program is listed in the white list (YES in step S365), the file is written in the client-side storage device 121 through the client-side file access controller 111 (step S367).

On the other hand, in the case where the main program is not listed in the white list (NO in step S365), whether the main program is listed in the redirect list is checked (step S369).

In the case where the main program is listed in the redirect list (Yes in step S369), the file is written in the server-side storage device 161 through the server-side file access controller 143 (step S371). Then, a set of the full path and name of the file supposed to be obtained if it would have been written in the client-side storage device 121 and a set of the full path and name of the file that has actually been written are added to the map list (step S373).

In the case where the main program is not listed in the redirect list (NO in step S369), this flow is ended without any processing. In this case, information indicating that the writing operation has failed may be notified to the program as an error code.

In the case where the main program activates another program as a child process, when an attribute indicating whether the main program is listed in the white list is passed over to the child program, it is possible to omit steps S361 and S363.

Figure 15:
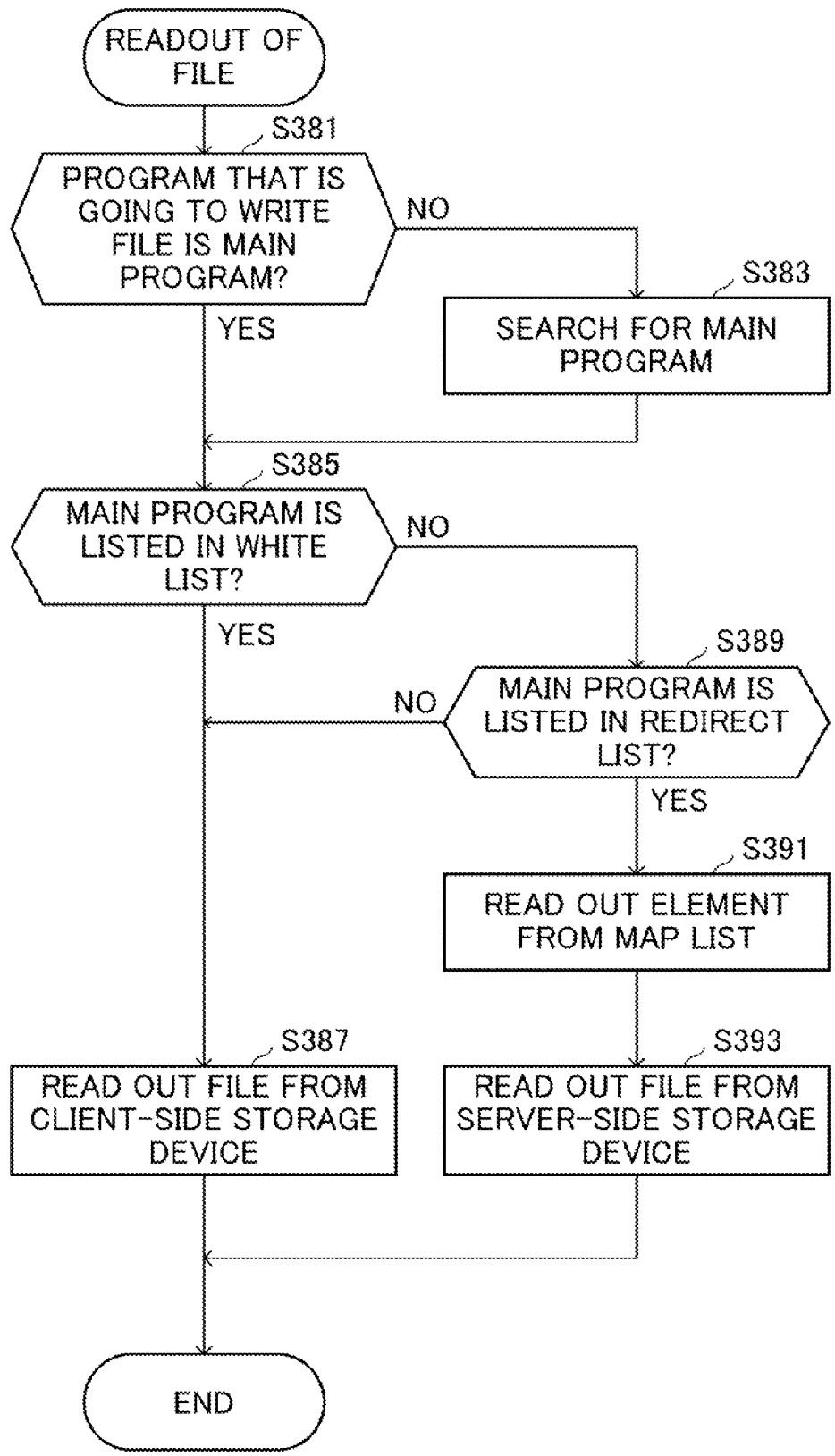
{FIG. 15} A flowchart showing a first operation of the file access destination control device at the readout time of a file according to the third embodiment of the present invention.

Next, a first example of operation performed when the file access destination controller 105 reads a file will be described with reference to FIG. 15.

First, whether the program that is going to read out a file is the main program or not is checked (step S381). In the case where the program is not the main program (NO in step S381), the main program is searched for by tracing a path to an invoker (step S383).

Then, whether the main program is listed in the white list stored in the white list retaining section 107 is checked (step S385).

In the case where the main program is listed in the white list (YES in step S385), the file is read out from the client-side storage device 121 through the client-side file access controller 111 (step S387).

On the other hand, in the case where the main program is not listed in the white list (NO in step S385) whether the main program is listed in the redirect list is checked (step S389).

In the case where the main program is listed in the redirect list (YES in step S389), a readout destination is searched for based on the correspondence between a set of the full path and name of the file supposed to be obtained if it would have been written in the client-side storage device 121 and a set of the full path and name of the file that has actually been written (step S391). Then, the file is read out from the server-side storage device 161 through the server-side file access controller 143 (step S393).

In the case where the main program is not listed in the redirect list (NO in step S389), the file is read out from the client-side storage device 121 through the client-side file access controller 111 (step S387).

In the case where the main program activates another program as a child process, when an attribute indicating whether the main program is listed in the white list is passed over to the child program, it is possible to omit steps S381 and S383.

Figure 16:
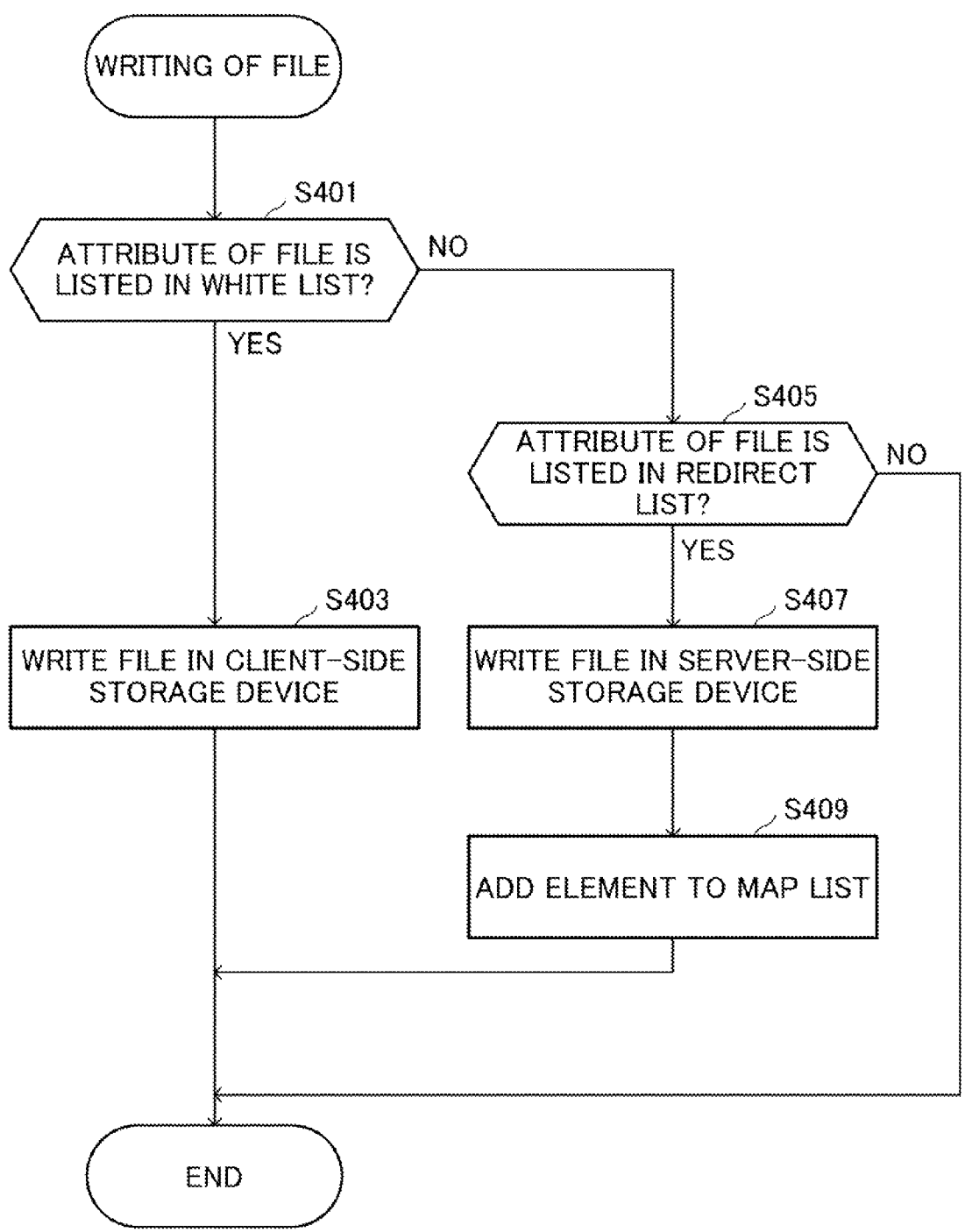
{FIG. 16} A flowchart showing a second operation of the file access destination control device at the writing time of a file according to the third embodiment of the present invention.

Next, a second example of operation performed when the file access destination controller 105 writes a file will be described with reference to FIG. 16.

First, whether the attribute of a file to be written is listed in the white list is checked (step S401).

In the case where the attribute of the file to be written is listed in the white list (YES in step S401), the file is written in the client-side storage device 121 through the client-side file access controller 111 (step S403).

On the other hand, in the case where the attribute of the file to be written is not listed in the white list (NO in step S401), whether the attribute of the file to be written is listed in the redirect list is checked (Step S405).

In the case where the attribute of the file to be written is listed in the redirect list (YES in step S405), the file is written in the server-side storage device 161 through the server-side file access controller 143 (step S407). Then, a set of the full path and name of the file supposed to be obtained if it would have been written in the client-side storage device 121 and a set of the full path and name of the file that has actually been written are added to the map list (step S409).

On the other hand, in the case where the attribute of the file to be written is not listed in the redirect list (No in step S405), this flow is ended without any processing.

Figure 17:
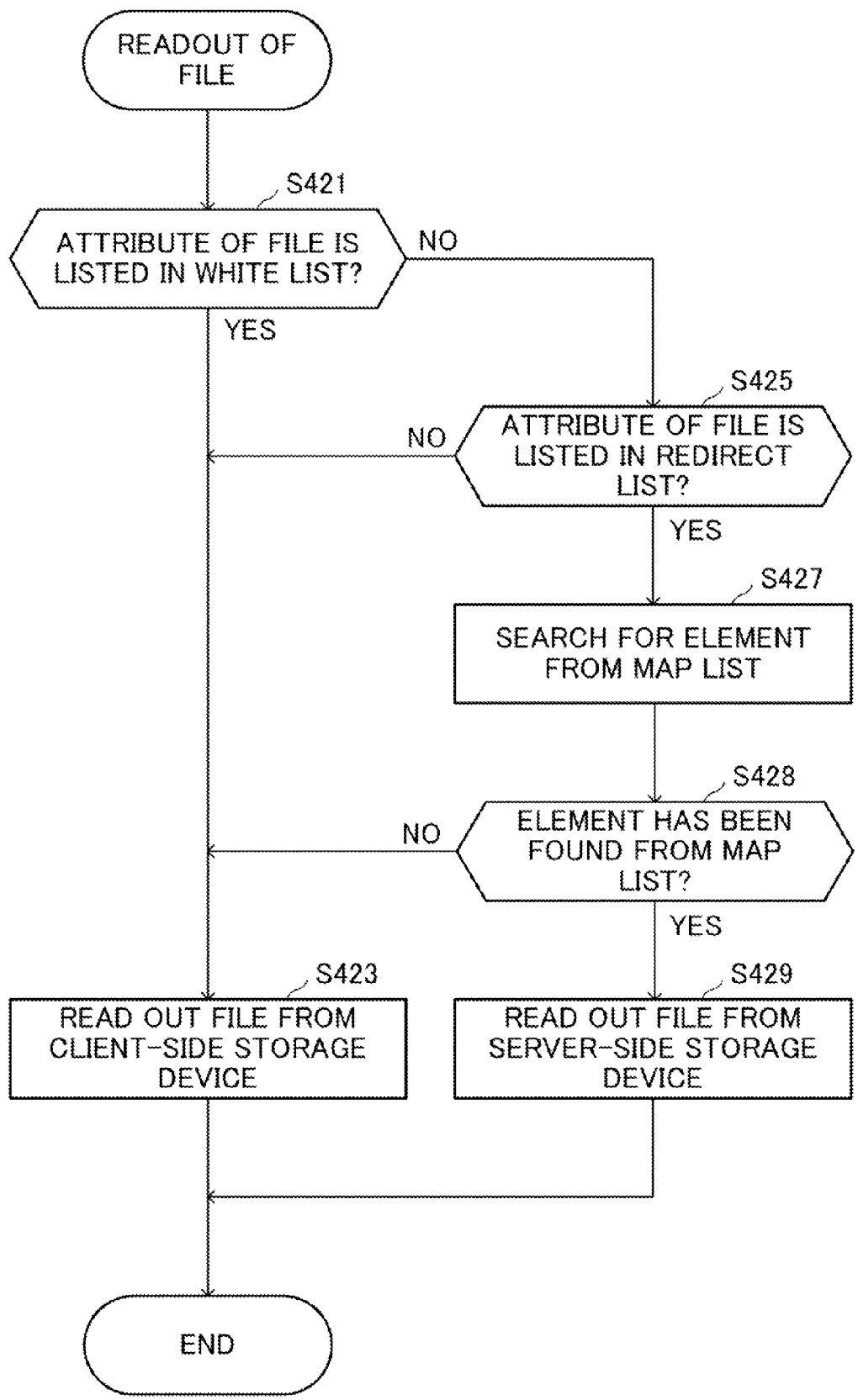
{FIG. 17} A flowchart showing a second operation of the file access destination control device at the readout time of a file according to the third embodiment of the present invention.

Next, a second example of operation performed when the file access destination controller 105 reads a file will be described with reference to FIG. 17.

First, whether the attribute of a file to be read out is listed in the white list is checked (step S421).

In the case where the attribute of the file to be read out is listed in the white list (YES in step S421), the file is read out from the client-side storage device 121 through the client-side file access controller 111 (step S423).

On the other hand, in the case where the attribute of the file to be read out is not listed in the white list (NO in step S421), whether the attribute of the file to be read out is listed in the redirect list is checked (step S425).

In the case where the attribute of the file to be read out is listed in the redirect list (YES in step S425), a readout destination is searched for based on the correspondence between a set of the full path and name of the file supposed to be obtained if it would have been written in the client-side storage device 121 and a set of the full path and name of the file that has actually been written which is retained in the map list (step S427). In the case where the readout destination has been found (YES in step S428), the file is read out from the server-side storage device 161 through the server-side file access controller 143 (step S429). In the case where the readout destination has not been found (NO in step S428), the file is read out from the client-side storage device 121 through the client-side file access controller 111 (step S423). On the other hand, the attribute of the file to be read out is not listed in the redirect list (NO in step S425), the file is read out from the client-side storage device 121 through the client-side file access controller 111 (step S423).

According to the third embodiment, it is possible to prevent a program whose name is listed neither in the white list nor redirect list from performing writing operation for a file. This prevents writing of data including a computer virus by a virus program of unknown file name.

[Fourth Embodiment]

Figure 18:
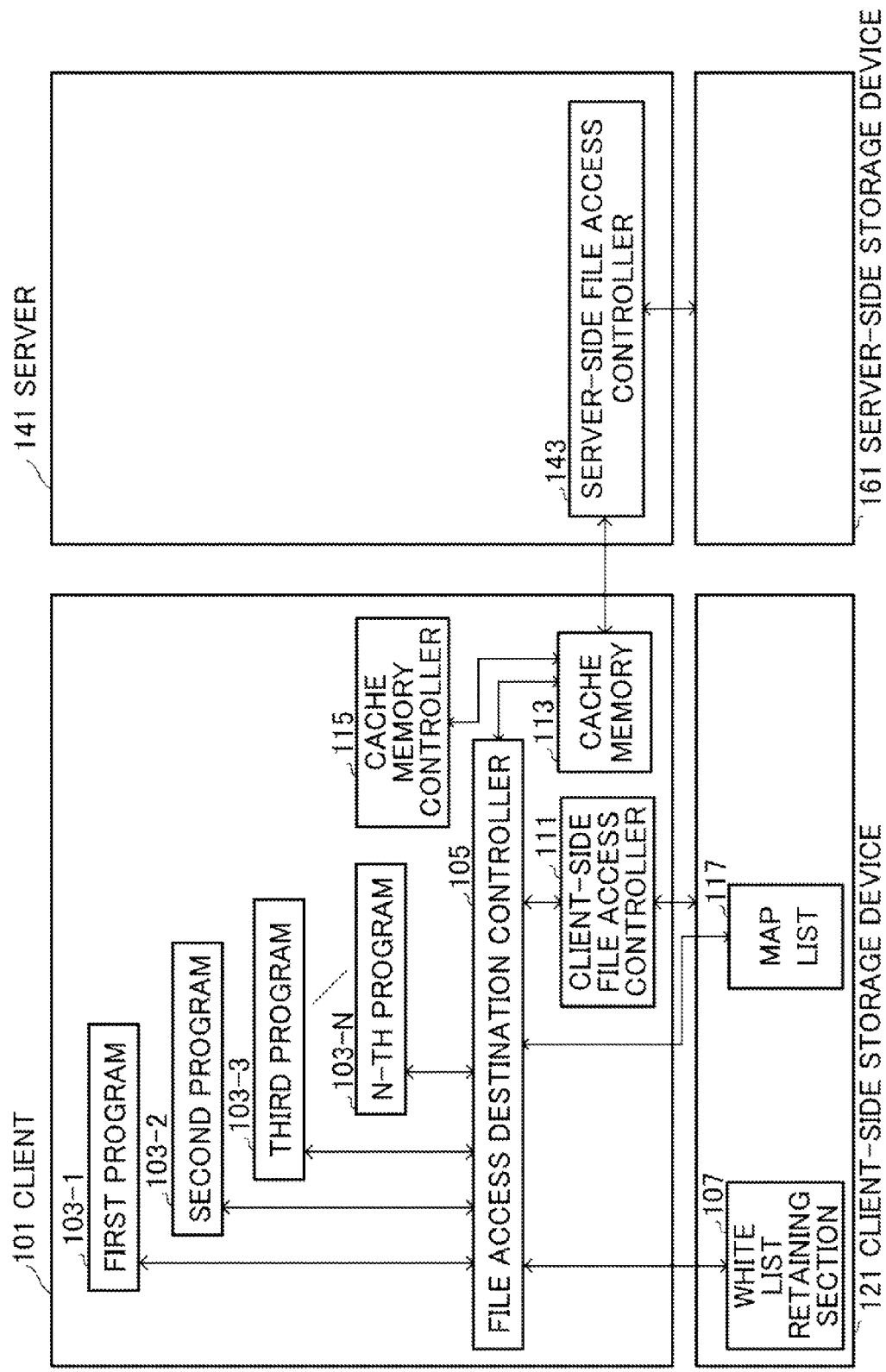
{FIG. 18} A view showing a configuration of a system including a file access destination control device according to a fourth embodiment of the present invention.

The fourth embodiment is a modification of the first embodiment. As is clear from a comparison between FIG. 18 showing a configuration of the fourth embodiment and FIG. 1 showing a configuration of the first embodiment, the fourth embodiment differs from the first embodiment in that a cache memory 113 and a cache memory controller 115 are additionally provided.

The cache memory 113 is disposed between the server-side file access controller 143 and file access destination controller 105. The cache memory controller 115 controls the cache memory according to a known algorithm (e.g., direct-map method, set-associative method, full-associative method, round-robin method, URL method, random method, write-through method, write-back method, snoop method, or directory method).

By using a volatile memory such as a DRAM as the cache memory 113, it is possible to prevent a copy of a file that would have been written in the server-side storage device 161 from being left after the power of the client 101 is tuned off.

By providing the cache memory 113, it is possible to achieve an increase in file access speed, suppression of an increase in network traffic, and enabling of the start of a program in an off-line state (state where the client is not connected to the server).

[Fifth Embodiment]

Figure 19:
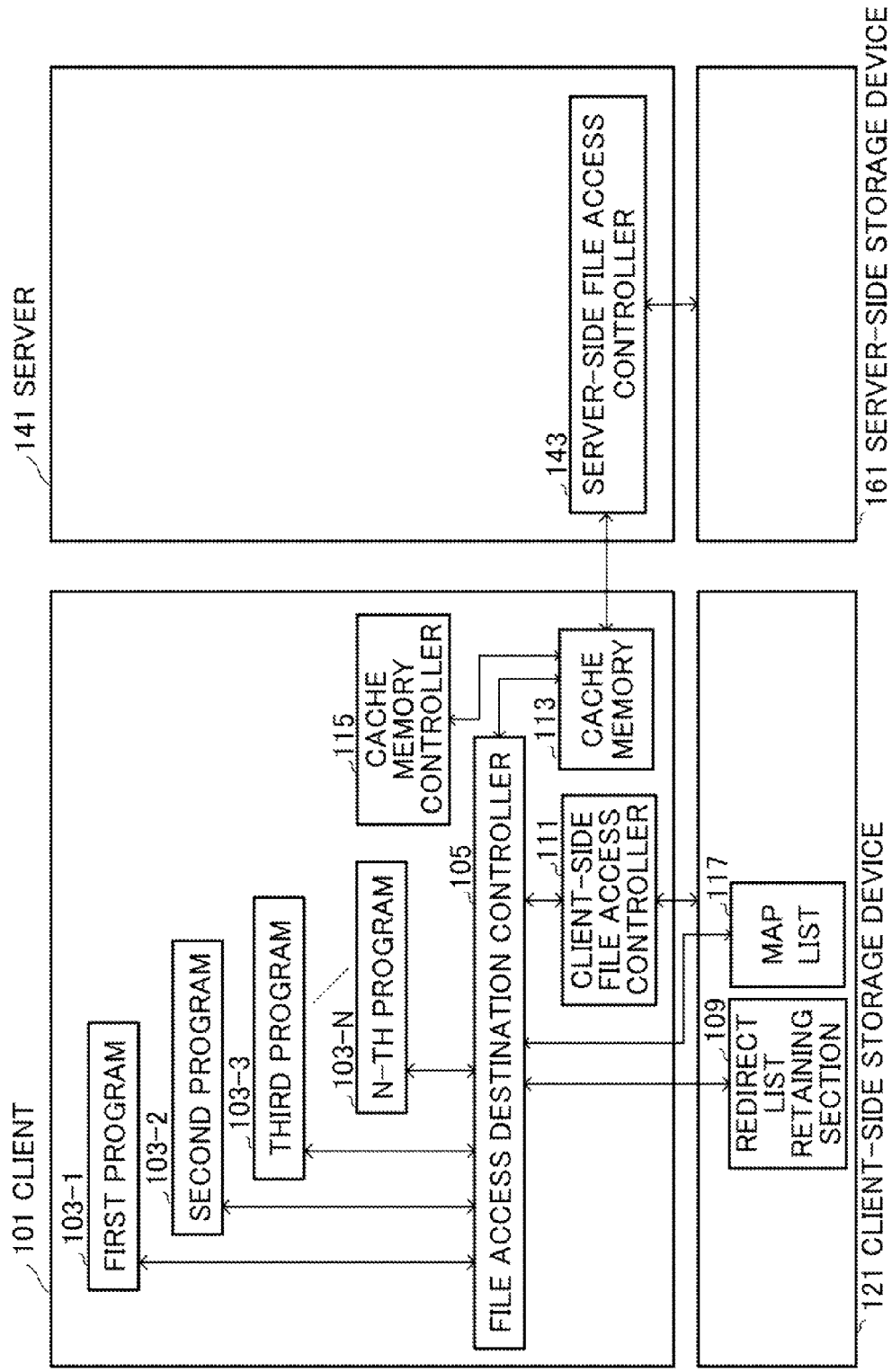
{FIG. 19} A view showing a configuration of a system including a file access destination control device according to a fifth embodiment of the present invention.

The fifth embodiment is a modification of the second embodiment in which the cache memory 113 and cache memory controller 115 are additionally provided. A configuration of the fifth embodiment is shown in FIG. 19. The control method of the cache memory and effect obtained by providing the cache memory are the same as those in the fourth embodiment.

[Sixth Embodiment]

Figure 20:
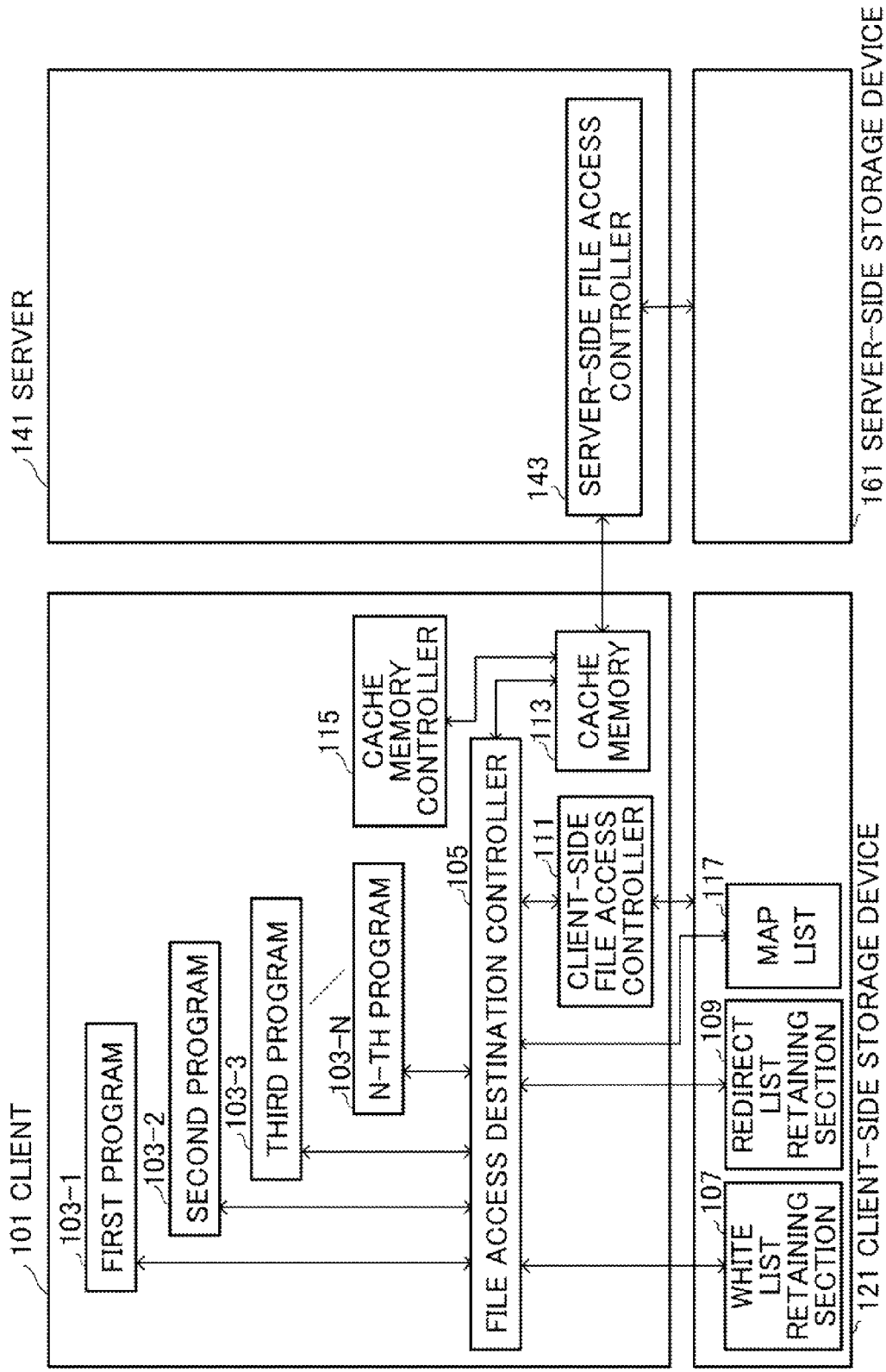
{FIG. 20} A view showing a configuration of a system including a file access destination control device according to a seventh embodiment of the present invention.

The sixth embodiment is a modification of the third embodiment in which the cache memory 113 and cache memory controller 115 are additionally provided. A configuration of the fifth embodiment is shown in FIG. 20. The control method of the cache memory and effect obtained by providing the cache memory are the same as those in the fourth embodiment.

In the above embodiments, the determination on whether the program is the parent program is made first and when the program is not a parent program, the parent program is searched for, and then it is determined whether the parent program is listed in the white list or redirect list. Alternatively, however, the determination on whether the parent program is listed in the white list or redirect list may be made first. In this case, the attribute of the parent program may be inherited to its child program when the parent program activates the child program.

With the access control described above, it is possible to prevent a file that has been written in the server-side storage device 161 from a client of a given user from being accessed by a client of another user.

Further, by encrypting a file on a per user basis, it is possible to prevent a file that has been written in the server-side storage device 161 from a client of a given user from being accessed by a client of another user.

Although a case where the program's desired access destination with respect to a file is the client-side storage device has been described in the above embodiments, if the program's desired access destination with respect to a file is the server-side storage device, then the actual access destination with respect to that file will be the server-side storage device.

Although the representative embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

INDUSTRIAL APPLICABILITY

According to the present invention, it is possible to prevent a devious program such as exposure virus from reading out a confidential file. This is because that a confidential file stored in the server-side storage device cannot be read out from a program whose name is listed in the white list or from a program whose name is not listed in the redirect list.

REFERENCE SIGNS LIST

100: Client
103-1 to 103-N: First program to N-th program
105: File access destination controller
107: White list retaining section
109: Redirect list retaining section
111: Client-side file access controller
113: Cache memory
115: Cache memory controller
117: Map list
121: Client-side storage device
141: Server
143: Server-side file access controller
161: Server-side storage device

The invention claimed is:

1. A file access destination control device which selects a client-side storage device or a server-side storage as an actual access destination with respect to a file having an access destination set to the client-side storage device by a program, the file access destination control device comprising:
   a computer processor and a memory;
   a unit stored in the memory and processed by the computer processor to set the access destination with respect to a file that is accessed by a first program, the first program's name being listed in a white list to the client-side storage device;
   a unit stored in the memory and processed by the computer processor to set a writing destination with respect to a file accessed by a second program, the second program's name not being listed in the white list to the server-side storage device; and
   a unit stored in the memory and processed by the computer processor to set a preferential readout destination with respect to a file accessed by the second program having a name not listed in the white list to the server-side storage device and setting a non-preferential readout destination with respect to the file accessed by the second program, the second program's name not being listed in the white list to the client-side storage device.

2. The file access destination control device according to claim 1,
   wherein each program of the first program and the second program refers to the program when the program is a parent program and refers to a parent program of the program when the program is a child program.

3. The file access destination control device according to claim 1,
   wherein when a given program activates another program as a child process, information on whether the given program is listed or not in the white list is inherited to the child program, and the file access destination control device operates on file access by the child program based on the inherited information.

4. A file access destination control device which selects a client-side storage device or a server-side storage as an actual access destination with respect to a file having an access destination set to the client-side storage device by a program, the file access destination control device comprising:
   a computer processor and a memory;
   a unit stored in the memory and processed by the computer processor to set a writing destination with respect to a file accessed by a first program, the first program's name being listed in a redirect list to the server-side storage device;
   a unit stored in the memory and processed by the computer processor to set a preferential readout destination with respect to a file accessed by the first program, the first program's name being listed in the redirect list to the server-side storage device and setting a non-preferential readout destination with respect to the file accessed by the first program, the first program's name being listed in the redirect list to the client-side storage device; and
   a unit stored in the memory and processed by the computer processor to set the access destination with respect to a file accessed by a second program, the second program's name not being listed in the redirect list to the client-side storage device.

5. The file access destination control device according to claim 4, wherein each program of the first program and the second program refers to the program when the program is a parent program and refers to a parent program of the program when the program is a child program.

6. The file access destination control device according to claim 4, wherein when a given program activates another program as a child process, information on whether the given program is listed or not in the redirect list is inherited to the child program, and the file access destination control device operated on file access by the child program based on the inherited information.

7. A file access destination control device which selects a client-side storage device or a server-side storage as an actual access destination with respect to a file having an access destination set to the client-side storage device by a program, the file access destination control device comprising:
   a computer processor and a memory;
   a unit stored in the memory and processed by the computer processor to set the access destination with respect to a file accessed by a first program, the first program's name being listed in a white list to the client-side storage device;
   a unit stored in the memory and processed by the computer processor to set a writing destination with respect to a file accessed by a second program, the second program's name being listed in a redirect list to the server-side storage device;
   a unit stored in the memory and processed by the computer processor to set a preferential readout destination with respect to a file accessed by the second program, the second program's name being listed in the redirect list to the server-side storage device and setting a non-preferential readout destination with respect to the file accessed by the second program, the second program's name being listed in the redirect list to the client-side storage device; and
   a unit stored in the memory and processed by the computer processor to prohibit a third program, the third program's name being listed neither in the white list nor the redirect list from performing writing operation of a file.

8. The file access destination control device according to claim 7, wherein each program of the first program, the second program, and the third program refers to the program when the program is a parent program and refers to a parent program of the program when the program is a child program.

9. The file access destination control device according to claim 7, wherein when a given program activates another program as a child process, information on whether the given program is listed or not in the white list is inherited to the child program, and the file access destination control device operates on file access by the child program based on the inherited information.

10. The file access destination control device according to claim 7, wherein when a given program activates another program as a child process, information on whether the given program is listed or not in the redirect list is inherited to the child program, and the file access destination control device operated on file access by the child program based on the inherited information.

11. A file access destination control device which selects a client-side storage device or a server-side storage as an actual access destination with respect to a file having an access destination set to the client-side storage device by a program, the file access destination control device comprising:
   a computer processor and a memory;
   a unit stored in the memory and processed by the computer processor to set the access destination with respect to a file having an attribute listed in a white list to the client-side storage device;

a unit stored in the memory and processed by the computer processor to set a writing destination with respect to a file having an attribute not listed in the white list to the server-side storage device; and a unit stored in the memory and processed by the computer processor to set a preferential readout destination with respect to a file having an attribute not listed in the white list to the server-side storage device and setting a non-preferential readout destination with respect to the file having an attribute not listed in the white list to the client-side storage device.

12. A file access destination control device which selects a client-side storage device or a server-side storage as an actual access destination with respect to a file having an access destination set to the client-side storage device by a program, the file access destination control device comprising:

a computer processor and a memory;

a unit stored in the memory and processed by the computer processor to set a writing destination with respect to a file having an attribute listed in a redirect list to the server-side storage device;

a unit stored in the memory and processed by the computer processor to set a preferential readout destination with respect to a file having an attribute listed in the redirect list to the server-side storage device and setting a non-preferential readout destination with respect to the file having an attribute listed in the redirect list to the client-side storage device; and a unit stored in the memory and processed by the computer processor to set the access destination with respect to a file having an attribute not listed in the redirect list to the client-side storage device.

13. A file access destination control device which selects a client-side storage device or a server-side storage as an actual access destination with respect to a file having an access destination set to the client-side storage device by a program, file access destination control device comprising:

a computer processor and a memory;

a unit stored in the memory and processed by the computer processor to set the access destination with respect to a file having an attribute listed in a white list to the client-side storage device;

a unit stored in the memory and processed by the computer processor to set a writing destination with respect to a file having an attribute listed in a redirect list to the server-side storage device;

a unit stored in the memory and processed by the computer processor to set a preferential readout destination with respect to a file accessed by the program, the program's name being listed in the redirect list to the server-side storage device and setting a non-preferential readout destination with respect to the file accessed by the program, the program's name being listed in the redirect list to the client-side storage device; and a unit stored in the memory and processed by the computer processor to prohibit writing operation of a file having an attribute listed neither in the white list nor the redirect list.

14. The file access destination control device according to claim 1, wherein the client includes a cache memory, and wherein the file access destination control device further comprises a unit stored in the memory and processed by the computer processor to access the server-side storage device through the cache memory when the client accesses the server-side storage device.

15. The file access destination control device according to claim 14, wherein the cache memory is a volatile memory.

16. A file access destination control method which selects a client-side storage device or a server-side storage as an actual access destination with respect to a file having an access destination set to the client-side storage device by a program, comprising the steps of:

setting, by a file access destination control device including at least a computer processor and a memory, the access destination with respect to a file that is accessed by the program, the program's name being listed in a white list to the client-side storage device;

setting, by the file access destination control device, a writing destination with respect to a file accessed by the program, the program's name not being listed in the white list to the server-side storage device; and setting, by the file access destination control device, a preferential readout destination with respect to a file accessed by the program, the program's name not being listed in the white list to the server-side storage device and setting a non-preferential readout destination with respect to the file accessed by the program, the program's name not being listed in the white list to the client-side storage device.

17. A file access destination control method which selects a client-side storage device or a server-side storage as an actual access destination with respect to a file having an access destination set to the client-side storage device by a program, comprising the steps of:

setting, by a file access destination control device including at least a computer processor and a memory, a writing destination with respect to a file accessed by the program, the program's name being listed in a redirect list to the server-side storage device;

setting, by the file access destination control device, a preferential readout destination with respect to a file accessed by the program, the program's name being listed in the redirect list to the server-side storage device and setting a non-preferential readout destination with respect to the file accessed by the program, the program's name being listed in the redirect list to the client-side storage device; and setting, by the file access destination control device, the access destination with respect to a file accessed by the program, the program's name not being listed in the redirect list to the client-side storage device.

18. A file access destination control method which selects a client-side storage device or a server-side storage as an actual access destination with respect to a file having an access destination set to the client-side storage device by a program, comprising the steps of:

setting, by a file access destination control device including at least a computer processor and a memory, the access destination with respect to a file accessed by the program, the program's name being listed in a white list to the client-side storage device;

setting, by the file access destination control device, a writing destination with respect to a file accessed by the program, the program's name being listed in a redirect list to the server-side storage device; and setting, by the file access destination control device, a preferential readout destination with respect to a file accessed by the program, the program's name being listed in the redirect list to the server-side storage device and setting the non-preferential readout destination with respect to the file accessed by the program, the program's name being listed in the redirect list to the client-side storage device; and prohibiting the program, the program's name being listed neither in the white list nor the redirect list from performing writing operation of a file.

19. A file access destination control method which selects a client-side storage device or a server-side storage as an actual access destination with respect to a file having an access destination set to the client-side storage device by a program, comprising the steps of:

setting, by a file access destination control device including at least hardware, the access destination with respect to a file having an attribute listed in a white list to the client-side storage device;

setting, by the file access destination control device, a writing destination with respect to a file having an attribute not listed in the white list to the server-side storage device; and setting, by the file access destination control device, a preferential readout destination with respect to a file having an attribute not listed in the white list to the server-side storage device and setting the non-preferential readout destination with respect to the file having an attribute not listed in the white list to the client-side storage device.

20. A file access destination control method which selects a client-side storage device or a server-side storage as an actual access destination with respect to a file having an access destination set to the client-side storage device by a program, comprising the steps of:

setting, by a file access destination control device including at least hardware, a writing destination with respect to a file having an attribute listed in a redirect list to the server-side storage device;

setting, by the file access destination control device, a preferential readout destination with respect to a file having an attribute listed in the redirect list to the server-side storage device and setting a non-preferential readout destination with respect to the file having an attribute listed in the redirect list to the client-side storage device; and setting, by the file access destination control device, the access destination with respect to a file having an attribute not listed in the redirect list to the client-side storage device.

21. A file access destination control method which selects a client-side storage device or a server-side storage as an actual access destination with respect to a file having an access destination set to the client-side storage device by a program, comprising the steps of:

setting, by a file access destination control device including at least a computer processor and a memory, the access destination with respect to a file having an attribute listed in a white list to the client-side storage device;

setting, by the file access destination control device, a writing destination with respect to a file having a attribute listed in a redirect list to the server-side storage device; and setting, by the file access destination control device, a preferential readout destination with respect to a file accessed by the program, the program's name being listed in the redirect list to the server-side storage device and setting a non-preferential readout destination with respect to the file accessed by the program, the program's name being listed in the redirect list to the client-side storage device; and prohibiting writing operation of a file having an attribute listed neither in the white list nor redirect list.

22. The file access destination control device according to claim 4, wherein the client includes a cache memory, and wherein the file access destination control device further comprises means for accessing the server-side storage device through the cache memory when the client accesses the server-side storage device.

23. The file access destination control device according to claim 22, wherein the cache memory is a volatile memory.

24. The file access destination control device according to claim 7, wherein the client includes a cache memory, and wherein the file access destination control device further comprises means for accessing the server-side storage device through the cache memory when the client accesses the server-side storage device.

25. The file access destination control device according to claim 24, wherein the cache memory is a volatile memory.

26. The file access destination control device according to claim 11, wherein the client includes a cache memory, and wherein the file access destination control device further comprises means for accessing the server-side storage device through the cache memory when the client accesses the server-side storage device.

27. The file access destination control device according to claim 26, wherein the cache memory is a volatile memory.

28. The file access destination control device according to claim 12, wherein the client includes a cache memory, and wherein the file access destination control device further comprises means for accessing the server-side storage device through the cache memory when the client accesses the server-side storage device.

29. The file access destination control device according to claim 28, wherein the cache memory is a volatile memory.

30. The file access destination control device according to claim 13, wherein the client includes a cache memory, and wherein the file access destination control device further comprises means for accessing the server-side storage device through the cache memory when the client accesses the server-side storage device.

31. The file access destination control device according to claim 30, wherein the cache memory is a volatile memory.

* * * * *